United States Patent
Tzuang et al.

(10) Patent No.: US 11,899,337 B2
(45) Date of Patent: Feb. 13, 2024

(54) OPTICAL MULTIPLEXER SWITCH TREE

(71) Applicant: Voyant Photonics, Inc., New York, NY (US)

(72) Inventors: Lawrence Dah Ching Tzuang, New York, NY (US); Steven A. Miller, New York, NY (US); Christopher T. Phare, New York, NY (US)

(73) Assignee: Voyant Photonics, Inc.

( * ) Notice: Subject to any disclaimer, the term of this patent is extended or adjusted under 35 U.S.C. 154(b) by 0 days.

(21) Appl. No.: 18/087,201

(22) Filed: Dec. 22, 2022

(65) Prior Publication Data

US 2023/0116990 A1    Apr. 20, 2023

Related U.S. Application Data

(63) Continuation of application No. 17/459,740, filed on Aug. 27, 2021, now Pat. No. 11,561,452.

(60) Provisional application No. 62/706,610, filed on Aug. 28, 2020.

(51) Int. Cl.
  *G02F 1/31*     (2006.01)
  *G02F 1/313*    (2006.01)

(52) U.S. Cl.
  CPC ............ *G02F 1/311* (2021.01); *G02F 1/3136* (2013.01)

(58) Field of Classification Search
  CPC .............................. G02F 1/311; G02F 1/3136
  See application file for complete search history.

(56) References Cited

U.S. PATENT DOCUMENTS

| | | | |
|---|---|---|---|
| 6,999,652 B2 | 2/2006 | Mino et al. | |
| 7,974,502 B2 | 7/2011 | Mino et al. | |
| 10,338,321 B2 | 7/2019 | Hosseini et al. | |
| 11,561,452 B2* | 1/2023 | Tzuang | G02F 1/311 |
| 2006/0034564 A1 | 2/2006 | Mino et al. | |
| 2016/0337731 A1 | 11/2016 | Graves | |
| 2022/0011643 A1 | 1/2022 | Shrestha et al. | |

FOREIGN PATENT DOCUMENTS

WO    2020056307 A1    3/2020

OTHER PUBLICATIONS

International Search Report issued on PCT International Patent Application No. PCT/IB2021/057885 dated Nov. 22, 2021.

* cited by examiner

*Primary Examiner* — John Bedtelyon
(74) *Attorney, Agent, or Firm* — Stratford Group Ltd

(57) ABSTRACT

Optical switch trees are commonly used to route light from one input channel to multiple possible output channels one at a time. As the number of output channels increases, the number of wire-bonding pads increases and the drive electronics becomes more complicated. The optical switch tree comprises an array of optical switches arranged in a plurality of rows of optical switches, each connected by a row bus, which are connected to a first multiplexer and a common power source; and a plurality of columns of optical switches, each connected by a column bus, which are connected to a second multiplexer and a common ground. A control processor selects one of the plurality of columns of optical switches to connect to the common ground, and selects one of the plurality of rows of optical switches to connect to the common power source, thereby selecting a single optical switch in the array of optical switches to activate.

20 Claims, 15 Drawing Sheets

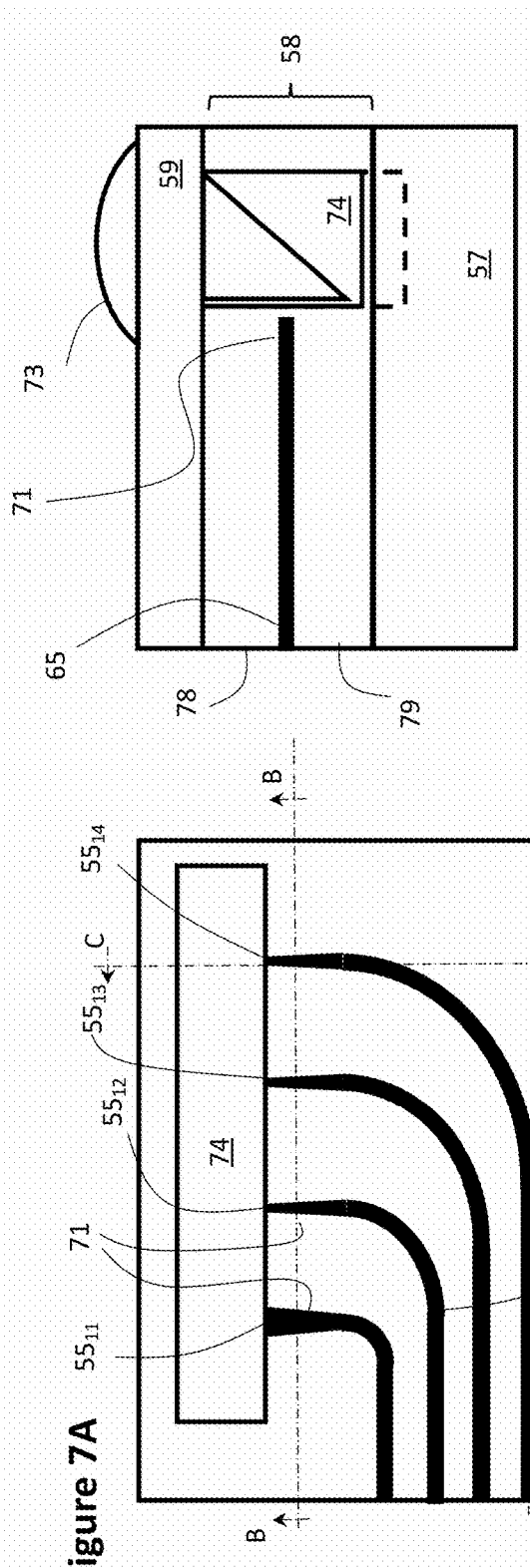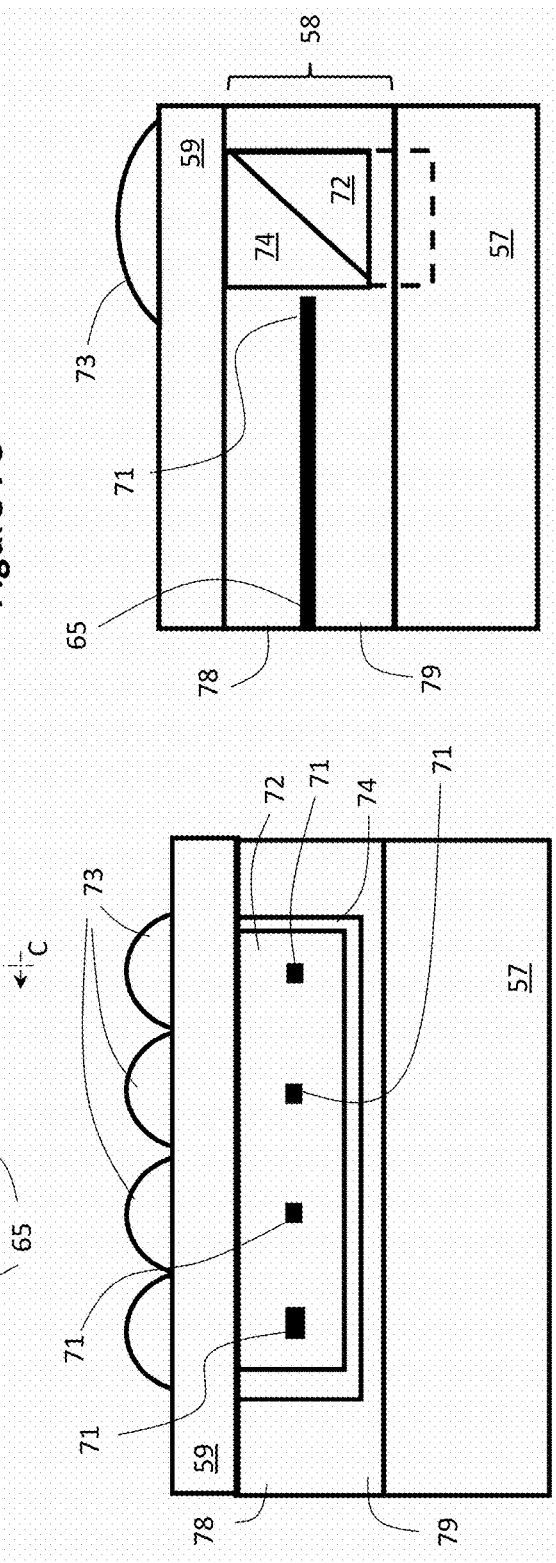

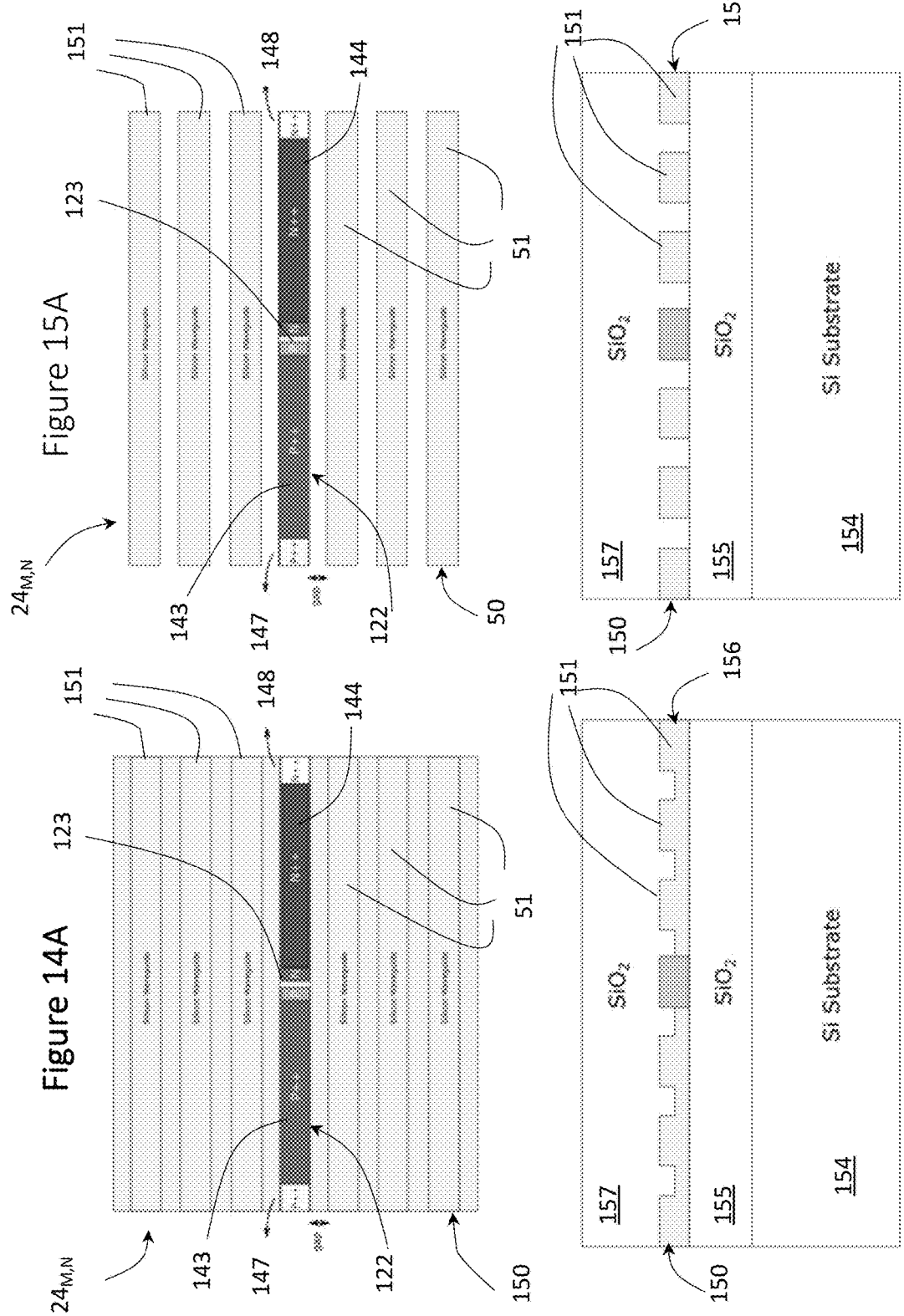

US 11,899,337 B2

OPTICAL MULTIPLEXER SWITCH TREE

CROSS REFERENCE TO RELATED APPLICATIONS

This application is a continuation of U.S. patent application Ser. No. 17/459,740, filed Aug. 27, 2021, now allowed, which claims priority to U.S. patent application Ser. No. 62/706,610, filed on Aug. 28, 2020, the contents of which are herein incorporated by reference.

TECHNICAL FIELD

The present disclosure relates to an optical multiplexer switch tree, and in particular to an optical multiplexer switch tree including an optical emitter device, an array of optical switches and a controller for selecting which combination of optical switches are activated.

BACKGROUND

On-chip optical switch trees, i.e. optical multiplexers, are commonly used to route light from one input channel to multiple possible output channels sequentially one at a time. Since the number of switches required in a switch tree equals the number of output channels minus one, conventionally, there is also the same number of electrical interfaces, e.g. wiring and pads, as the number of switches. Therefore, as the number of output channels increases, the number of wire-bonding pads increases as well, which becomes a problem for packaging. Similarly, the drive electronics become more complicated, adding additional digital to analog converters to drive each switch. Furthermore, the layout of the on-chip wires, bond pads, integrated circuit package, and underlying printed circuit board also becomes much more complicated.

In a conventional optical switch tree, a single input light source may be routed to one of a plurality of optical outputs, one at a time, and may be routed to each of the plurality of outputs sequentially over a longer time, e.g. N periods of time. The optical switch tree may comprise N−1 controllable switches, arranged in progressive levels L, e.g. Level 1 to Level p, with $2^L$ number of controllable switches in each of the level. Accordingly, level 0 has $2^0=1$ switch $0_1$, level 1 has $2^1=2$ switches, level 2 has $2^2=4$ switches, level 3 has $2^3=8$ switches, level 4 has $2^4=16$ switches, etc, as required. The controllable switches in each level may be adjacent one another, vertically stacked in a direction perpendicular to the direction of light travelling from the input light source to the optical outputs. Conventionally, as the number of optical outputs N increases, the total number of switches also increases to N−1, which, because each switch needs its own wiring and bond pad, leads to an electrical interface problem, where the number of bond pads is prohibitively high, consuming too much chip area or costing too much to implement.

Conventional integrated optical phased arrays launch and receive beams of light at a variety of controllable angles for various applications, including free-space communications, holography, and light detection and ranging (LIDAR). A LIDAR sensor is an optical remote sensor that measure the distance to a target, by irradiating the target with light, using pulses or a modulated signal from a laser, and measuring the time it takes the light to travel to and from the target to a receiver in the LIDAR sensor. When, the reflected pulses or modulated signals are detected, the time of flight of the pulses or modulated signals correspond to the distance to the sensed target. LIDAR sensors are important components in autonomous vehicles, drone navigation systems, and robot interaction, but is currently costly and relatively large.

Phase shifters are often used to shift the phase of light propagating through a waveguide. A thermal phase shifter, also referred to as a thermo-optic phase shifter, may be used to shift the phase of light in a waveguide by heating the waveguide, thereby changing the refractive index of the waveguide in a heated area via the thermo-optic effect. Any light propagating through the heated area with the slightly-changed index value travels at a different phase velocity, creating a net phase shift after some propagation length. In this manner, thermal phase shifters may be used to control switching, attenuation, or modulation of an optical signal.

An object of the present disclosure is to provide an optical multiplexer switch tree with a simpler electrical interface and a decreased number of bond pads, and in particular to an optical multiplexer switch tree that may include an array of optical switches and a controller for selecting which combination of optical switches are activated. suitable for various applications, including free-space communications, holography, and light detection and ranging (LIDAR).

SUMMARY

Accordingly, a first apparatus includes an optical device comprising:

an optical switch tree comprising a plurality of optical switches arranged in a plurality levels of optical switches, each of the plurality of optical switches optically coupled to one of the plurality of optical switches in a previous level and optically coupled to and configured to select between two of the plurality of optical switches in a subsequent level;

at least one of the plurality of levels of optical switches comprising:

an array of optical switches arranged in a plurality of rows of optical switches, and a plurality of columns of optical switches;

a plurality of row buses, each one of the plurality of row buses configured to connect one of the plurality of rows of optical switches to a common power source;

a first multiplexer configured to selectively connect one of the plurality of row buses to the common power source, while disconnecting others of the plurality of row buses;

a plurality of column buses, each one of the plurality of column buses configured to connect one of the plurality of columns of optical switches to a common ground;

a second multiplexer configured to selectively connect one of the plurality of column buses to the common ground, while disconnecting others of the plurality of column buses;

a processor; and a non-transitory memory for storing instructions, which when for executed by the processor:

select one of the plurality of columns of optical switches to connect to the common ground, and select one of the plurality of rows of optical switches to connect to the common power source, thereby selecting a single optical switch in the array of optical switches to activate.

BRIEF DESCRIPTION OF THE DRAWINGS

Some example embodiments will be described in greater detail with reference to the accompanying drawings, wherein:

FIG. 7A is a plan view of a section of the emitter array of FIG. 6 with the turning substrate removed;

FIG. 7B is an end view of the section of the emitter array of FIG. 7A including the turning substrate;

FIG. 7C is an cross-sectional view of the section of the emitter array of FIG. 7A including the turning substrate;

FIG. 7D is an cross-sectional view of the section of the emitter array of FIG. 7A with an alternative example turning reflector and including the turning substrate;

FIG. 14A is a top view of an exemplary optical waveguide arrangement of the multi-pass optical waveguide phase shifter of FIG. 13;

FIG. 14B is a cross-section view of the optical waveguide arrangement of FIG. 14A;

FIG. 15A is a top view of an exemplary optical waveguide arrangement of the multi-pass optical waveguide phase shifter of FIG. 13;

FIG. 15B is a cross-section view of the optical waveguide arrangement of FIG. 15A;

DETAILED DESCRIPTION

Figure 1:
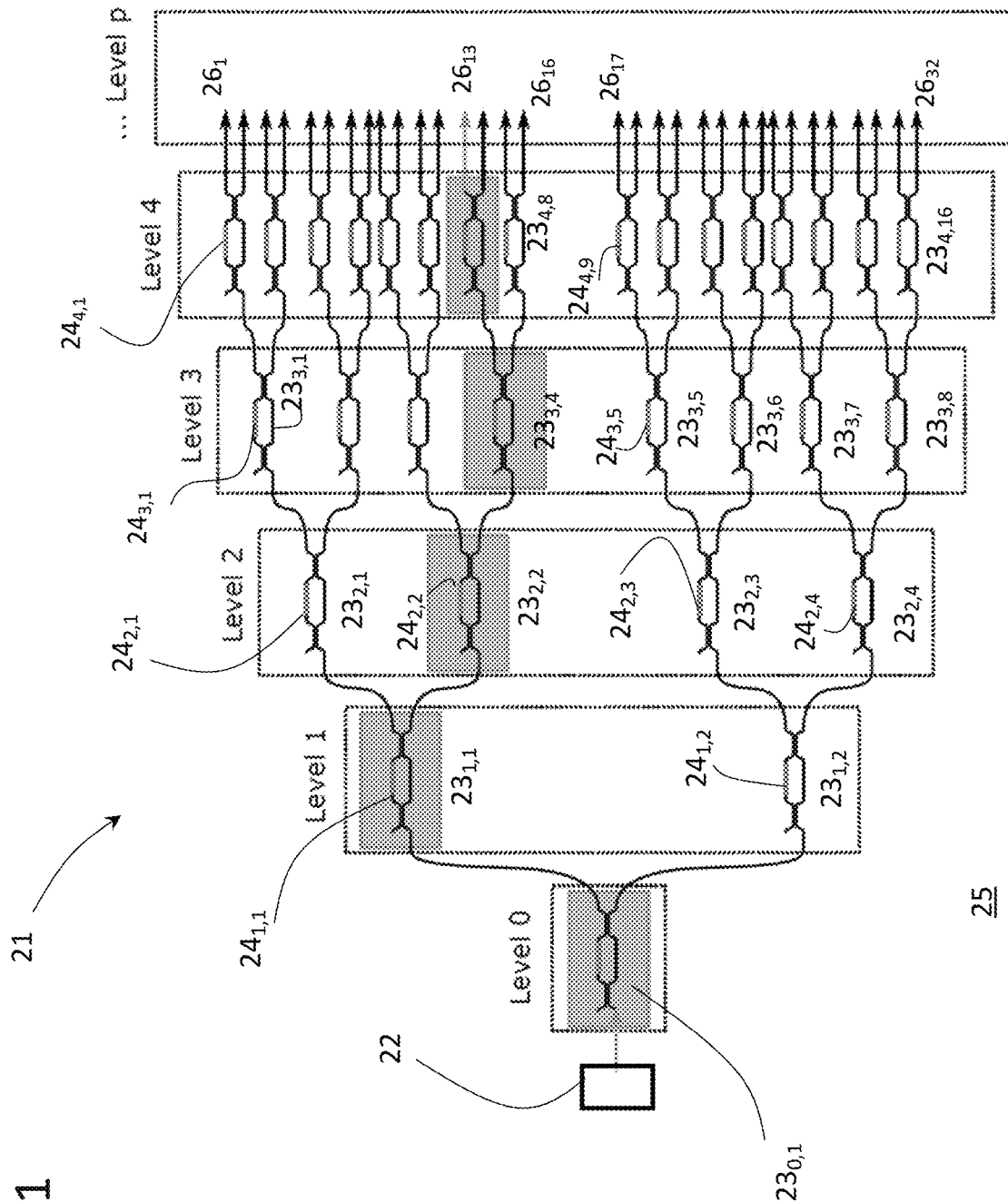
FIG. 1 is a schematic diagram of an optical multiplexer switch tree in accordance with the present disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art.

FIGS. 1-4 illustrate an optical multiplexer switch tree device 21, in accordance with the present disclosure, in which light from a single input light source 22 may be routed to one of a plurality of (N) outputs $26_1$ to $26_N$, e.g. N=32, one at a time, and may be routed to each of the plurality of outputs $26_1$ to $26_N$ sequentially over a longer time, e.g. N periods of time. The optical multiplexer switch tree device 21 may comprise N-1 controllable optical switches 23, arranged in progressive cascading levels L, e.g. Level 1 to Level P, with $2^L$ number of controllable optical switches 23 in each of the levels, with the outputs of one level optically coupled to the inputs of the next level, i.e. each time the light is directed between one or two outputs, the next level of optical switches comprises twice as many optical switches, e.g. 1×2 switches, as the previous level to subsequently direct the light to twice as many possible outputs as the previous level of optical switches 23. Accordingly, level 0 has $2^0=1$ switch $23_{0,1}$, level 1 has $2^1=2$ switches $23_{1,1}$ to $23_{1,2}$, level 2 has $2^2=4$ switches $23_{2,1}$ to $23_{2,4}$, level 3 has $2^3=8$ switches $23_{3,1}$ to $23_{3,8}$, level 4 has $2^4=16$ switches $23_{4,1}$ to $23_{4,16}$, etc., as required. Each controllable optical switch 23 may be a 1×2 or 2×2 integrated optical waveguide switch, for example, each controllable optical switch 23 may be a balanced Mach-Zehnder interferometer (MZI) comprised of at least one input port, a first arm, a second arm, and at least two output ports, at least one of the first arm or the second arm is phase-tuned by a phase tuner, e.g. thermally phase tuned by a micro-heater, $24_{0,1}$ to $24_{4,16}$. Each phase tuner $24_{0,1}$ to $24_{4,16}$ may be modeled as a resistor in the electrical circuit diagram (FIG. 4), and each phase tuner $24_{0,1}$ to $24_{4,16}$ may be independently controlled by a controller processor 30 executing instructions stored on non-transitory memory provided with the controller processor 30 or remote therefrom, but in communication therewith. The optical multiplexer switch tree device 21 may be fabricated on a single photonic integrated circuit chip 25, or on a plurality of optically interconnected chips.

Figure 2:
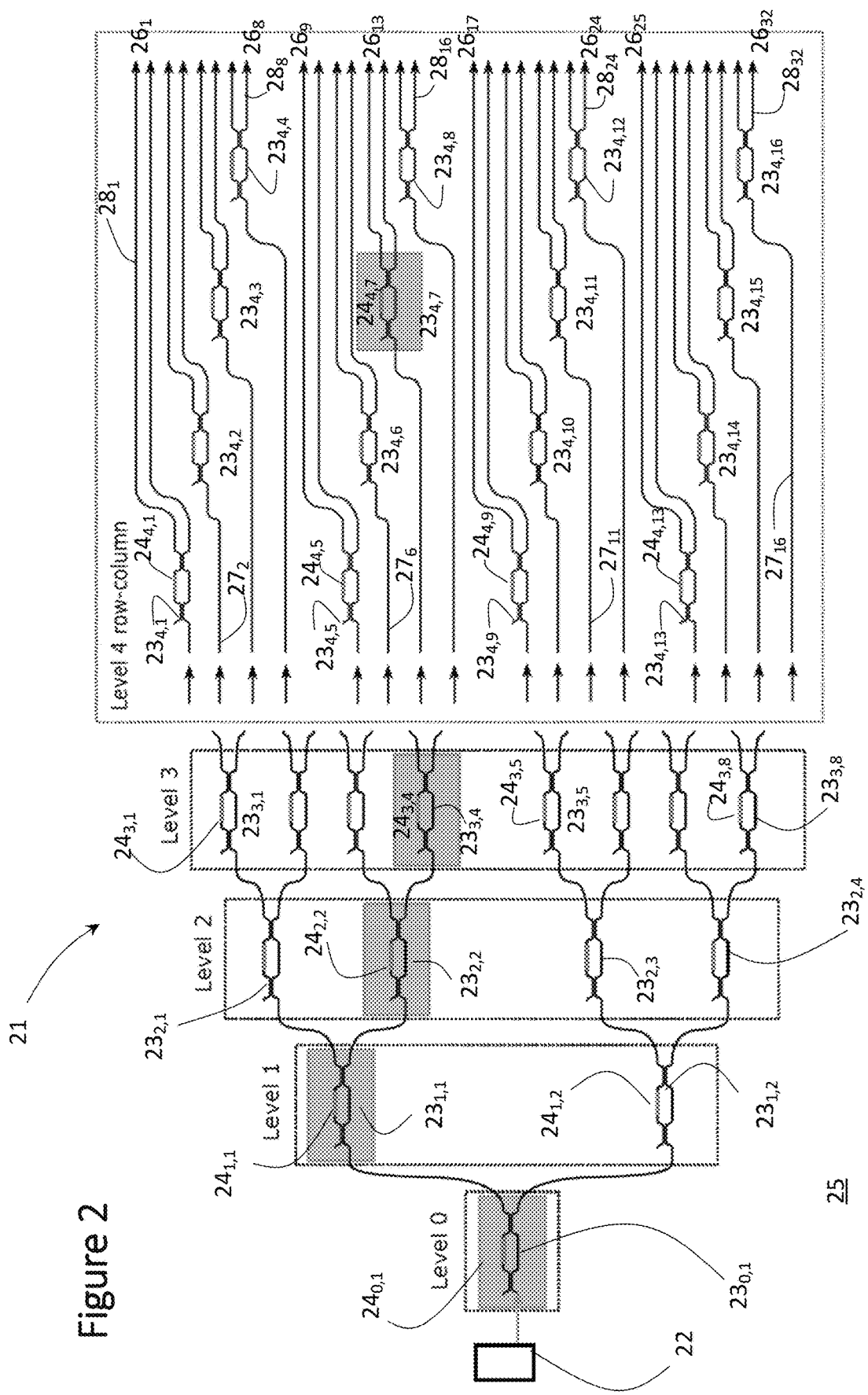
FIG. 2 is a schematic diagram of an optical multiplexer switch tree in accordance with the present disclosure.
Figure 3:
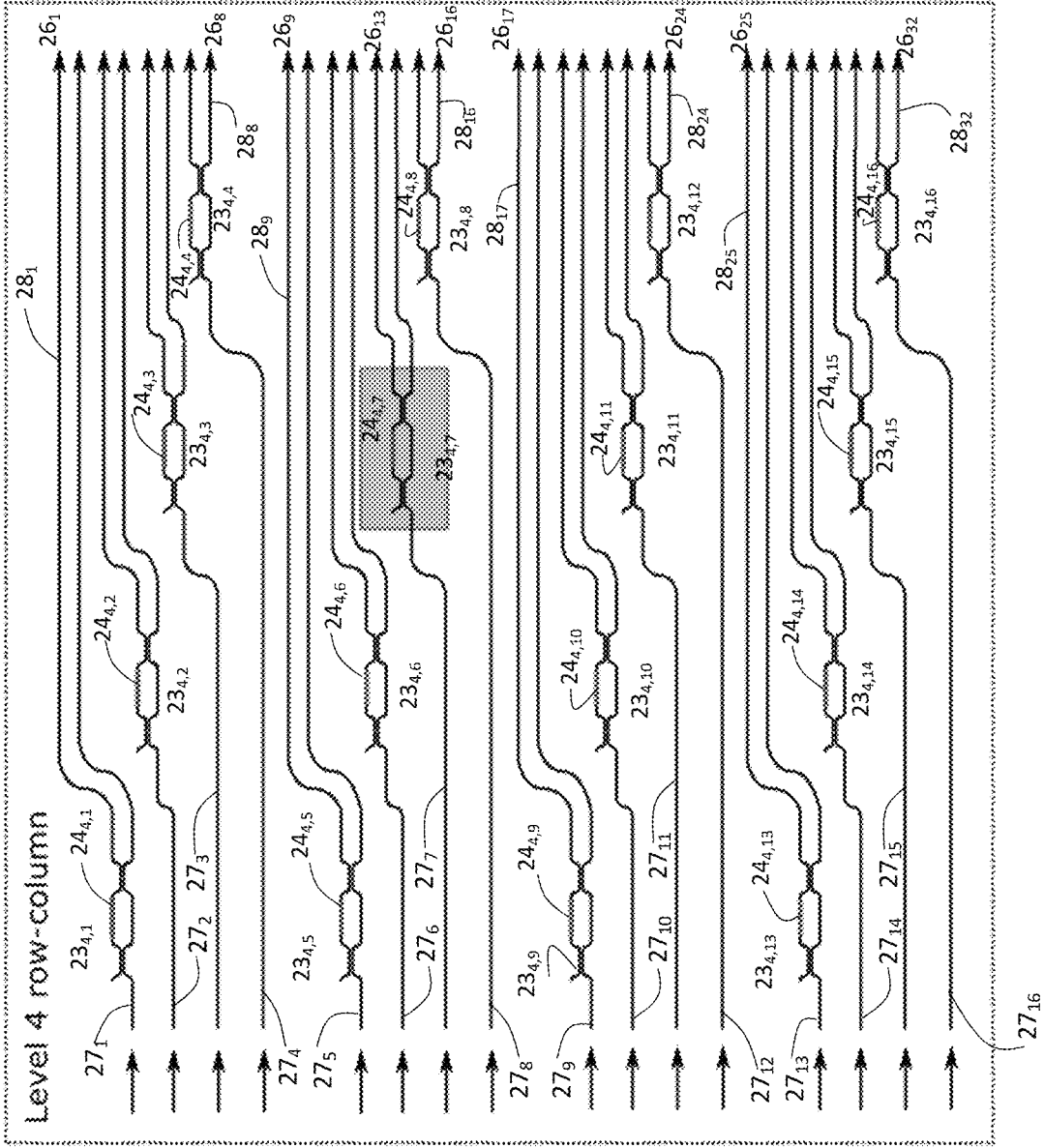
FIG. 3 is a schematic diagram of a level of the optical multiplexer switch tree of FIG. 2.

In the illustrated exemplary optical multiplexer switch tree device 21, the controllable optical switches 23 for one or more of the levels in the optical multiplexer switch tree device 21 may be arranged into a row-column configuration. For example, FIGS. 2 and 3 illustrate a reconfiguration of level 4 in the optical multiplexer switch tree device 21 to include sixteen optical inputs, sixteen optical switches $23_{4,1}$ to $23_{4,16}$, and thirty two optical output ports $26_1$ to $26_{32}$ into a 4×4 row-column array configuration. The optical switches, e.g. optical switches $23_{4,1}$ to $23_{4,16}$, may be arranged into a plurality of groups of optical switches, and each group of optical switches may form a row of optical switches 23, while the corresponding or respective optical switches 23 in each group form a column of optical switches 23, e.g. the first optical switch in each group, form a first column of optical switches, e.g. $23_{4,1}$, $23_{4,5}$, $23_{4,9}$ and $23_{4,13}$, the second optical switch in each group form a second column of optical switches, e.g. $23_{4,2}$, $23_{4,6}$, $23_{4,10}$ and $23_{4,14}$, etc. The optical switches in each group, e.g. a first group of optical switches $23_{4,1}$-$23_{4,4}$, may be laterally spaced apart from each other utilizing input optical waveguides $27_1$ to $27_{N/2}$ with different lengths extending from a first edge of the chip 25 or the previous level of optical switches, e.g. optical switches $23_{3,1}$ to $23_{3,N/4}$. The input optical waveguides $27_1$ to $27_{N/2}$ in each group, i.e. each row of optical switches 23, may get progressively longer, i.e. farther, from the previous level than a previous optical switch 23 in a same group or row, thereby laterally staggering the optical switches 23 in each group or row. For example, the input optical waveguide, e.g. the fourth input optical waveguide $27_4$, for the last optical switch, e.g. the fourth optical switch $23_{4,4}$, (farthest from the previous level) in the group of optical switches is longer than the input optical waveguides, e.g. the first, second and third input optical waveguides $27_1$ to $27_3$, for the previous optical switches in the same group of optical switches, e.g. optical switches $23_{4,1}$ to $23_{4,3}$, respectively; the input optical waveguide, e.g. the first input optical waveguide $27_3$, of the second last optical switch, e.g. the third optical switch $23_{4,3}$, is longer than the input optical waveguides, e.g. the first and second input optical waveguides $27_1$ and $27_2$, for the previous optical switches, e.g. the first and second optical switches $23_{4,1}$ and $23_{4,2}$; and the input optical waveguide, e.g. the second input optical waveguide $27_2$, of the second optical switch, e.g. optical switch $23_{4,2}$ is longer than the input optical waveguide, e.g. the first input optical waveguide $27_1$, for the previous optical switch, e.g. the first optical switch $23_{4,1}$.

Each optical switch, e.g. optical switches $23_{4,1}$-$23_{4,4}$, in each group of optical switches, e.g. the first group, may also have a pair of output optical waveguides, e.g. output optical waveguides $28_1$ to $28_8$, with different lengths extending to a same perpendicular plane, e.g. an another (opposite) edge to the first edge, of the chip 20. The output optical waveguide pairs $28_1/28_2$ to $28_{N-1}/28_N$ in each group, i.e. each row of optical switches 23, may get progressively shorter, i.e. closer, to a subsequent level than a previous optical switch 23 in a same group or row, thereby laterally staggering the optical switches 23 in each group or row. For example, the seventh and eighth output optical waveguides $28_7$ and $28_8$ for the fourth optical switch $23_{4,4}$ are shorter than for the previous (first to sixth) output optical waveguides $28_1$ to $28_6$ for the previous (first to third) optical switches $23_{4,1}$ to $23_{4,3}$; and the third and fourth output optical waveguides $28_3$ to $28_4$ are shorter than the previous (first and second) output optical waveguides $28_1$ and $28_2$ for the first optical switch $23_{4,1}$. Some of the input optical waveguides $27_1$ to $27_{N/2}$ and/or the output optical waveguides $28_1$ to $28_N$ may include one or more bends, e.g. an s-shaped bend, to enable the optical switches, e.g. optical switches $23_{4,1}$-$23_{4,4}$, in each group to be in closer alignment, laterally. For example, in the illustrated embodiment, the input optical waveguides, e.g. $27_1$ to $27_4$, in each group include a different length bend, e.g. progressively longer, and/or the output optical waveguide pairs, e.g. $28_1/28_2$ to $28_7/28_8$ in each group include a different length bend, e.g. progressively smaller, configured to position the optical switches, e.g. $23_{4,1}$ to $23_{4,4}$, in each group closer together vertically, whereby the optical switches, e.g. optical switches $23_{4,1}$-$23_{4,4}$, in each group are substantially laterally aligned, instead of vertically aligned, as in the conventional switch tree 11.

The controllable optical switches, e.g. optical switches $23_{0,1}$ to $23_{3,8}$, in the first 2-4 levels may be arranged adjacent one another, vertically stacked in a direction perpendicular to the direction of light travelling from the input light source 22 to the optical outputs $26_1$ to $26_N$, to save space on the chip 20 in the lateral direction.

Figure 4:
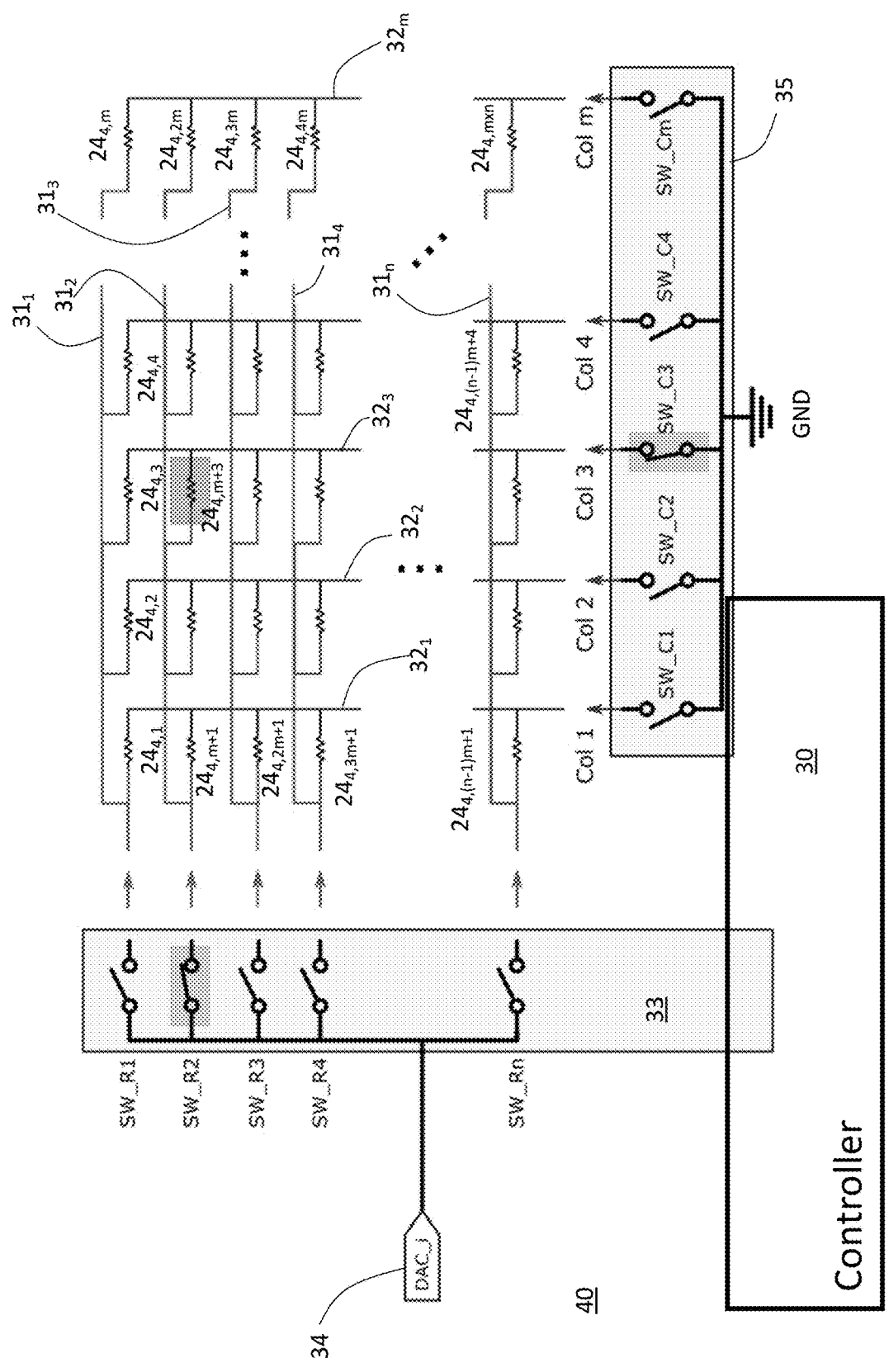
FIG. 4 is a schematic diagram of the control system of the optical multiplexer switch tree of FIG. 2.

With reference to FIG. 4, the groups of switches with laterally and vertically spaced switches $23_{4,1}$ to $23_{4,n\times m}$ (n×m=N/2) arranged in an n×m array of optical switches, with n rows of m switches each, facilitates row-column electrical addressing, in which a first contact, e.g. the anode, of the phase tuner, e.g. $24_{4,1}$ to $24_{4,m}$, of each row of switches, e.g. $23_{4,1}$ to $23_{4,m}$, are connected to a DAC-bus or a row-bus $31_1$ to $31_n$, and a second contact, e.g. the cathode, of the phase tuner, e.g. $24_{4,1}$, $24_{4,5}$, $24_{4,9}$, and $24_{4,13}$, of each column are connected to a ground-bus or a column-bus $32_1$ to $32_m$. The row-buses $31_1$ to $31_n$ are then connected to a first electrical analog multiplexer 33 that connects one or more (preferably only one) of the row-buses $31_1$ to $31_n$ to an independent DAC channel 34 at a same time, while disconnecting all other row buses $31_1$ to $31_n$, under control of the processor 30, executing instructions saved on non-transitory memory provided with the processor 30 or remote therefrom. Similarly, the column buses $32_1$ to $32_m$ are connected to a second electrical analog multiplexer 35 that connects one or more (preferably only one) of the column-buses $32_1$ to $32_m$ to ground (GND) at a same time, while disconnecting all other column buses $32_1$ to $32_n$, under control of the controller processor 30, executing instructions saved on non-transitory memory provided with the controller processor 30 or remote therefrom. As a result, the controller processor 30 may select one phase tuner, e.g. micro-heater, $24_{0,1}$, $24_{1,1}$, $24_{2,2}$, and $24_{3,4}$, from one optical switch, e.g. optical switches $23_{0,1}$, $23_{1,1}$, $23_{2,2}$, and $23_{3,3}$, from each of the previous levels, and then one of the row-select switches, e.g. SW_R2, may be activated by the first analog multiplexer 33, and one of the column-select switches, e.g. SW_C3, in the second analog multiplexer 35 to select one phase tuner, e.g. micro-heater $24_{4,m+3}$, $(24_{4,7})$ in the array of switches $23_{4,1}$ to $23_{4,m\times n}$ to flow current and generate heat in the respective phase tuner, e.g. phase tuner $24_{0,1}$, $24_{1,1}$, $24_{2,2}$, $24_{3,4}$ and $24_{4,7}$.

Optionally, each phase tuner 24 may comprise a resistor and diode in series, as further defined with reference to FIGS. 12-16 configured to enable current flow from the higher potential on the row-buses $31_1$ to $31_n$ to the lower potential on the respective column buses $32_1$ to $32_n$. The diode may be integrated as part of the phase tuner 24, such that power dissipated in the diode induces a phase shift that contributes to switch operation. Alternatively, the diode may be separated from the phase tuner 24 such that only its electrical effects, e.g. preventing current flowing in other phase tuners 24 in the same row, are significant but it contributes negligibly to switch operation. Without the diode, current can flow through unintended phase tuners 24 not selected by the row/column pair. While this current does not affect optical operation of the circuit because no light is flowing through the switches 23 underlying these phase tuners 24, including the diodes are preferred because they substantially eliminate the parasitic power consumption of the unintended current paths.

Since each level in the optical multiplexer switch tree device 21 has one phase tuner 24 turned on, when selected properly by the controller processor 30, light will be directed from the light source 22 to the desired or selected output port $26_1$ to $26_{n\times m}$ of the optical multiplexer switch tree device 21, e.g. switches $23_{0,1}$, $23_{1,1}$, $23_{2,2}$, $23_{3,4}$ and $23_{4,7}$ result in light exiting output $26_{13}$. While current may be supplied to other phase tuners 24 in the same level, e.g. level 4, the other corresponding switches 23 in which light is not transmitted from the previous level, do not change which output optical port $26_1$ to $26_{n\times m}$ the light exits, and may thus be set to any value, i.e. don't care condition. This is typically because light has been directed away from the corresponding switches by previous switches, e.g. switches $23_{0,1}$, $23_{1,1}$, $23_{2,2}$, and $23_{3,4}$, in prior levels of the optical multiplexer switch tree device 21. Accordingly, the control processor 30 need only control the power dissipated in a small number of the switches, e.g. switches $23_{0,1}$, $23_{1,1}$, $23_{2,2}$, $23_{3,4}$ and $23_{4,7}$ to control which output optical port $26_1$ to $26_{n\times m}$ of the optical multiplexer switch tree device 21 is illuminated with the light.

The present disclosure relates to the optical multiplexer switch tree device 21, in which the electrical connection to each level thereof may be configured independently as a row-column addressing. The 1-by-N optical multiplexer switch tree has N output ports and a total number of (N−1) 1:2 or 2:2 optical switches 23. The 1:2 and 2:2 optical switches 23 may be Mach-Zehnder Interferometers with a micro-heater 24 heating one of the arms. N is preferably a power of 2. The total number of levels (p) is preferably equal to log 2(N).

At least one of the levels of the optical multiplexer switch tree device 21 may be arranged into a logical grid or array of rows n and columns m, where n×m=N/2. Preferably the number of rows n equals the number of columns m, i.e. a square array. If a square array is not possible because the number of switches 23 is not a square number, preferably the number of rows n and number of columns m is chosen such that the sum of the number of rows n and number of columns m is minimized, e.g. 4 rows and 8 columns for a 32-switch level. The switches 23 may further be arranged physically into a two-dimensional rectangular array corresponding to the logical row/column grid (FIG. 3). Such a rectangular array simplifies the electrical wiring by allowing column and row wires to be routed in substantially straight lines. The number of rows n times the number of columns m for each row-column addressing level may equal 2 to the power of the level number. For example, for the fourth level of a switch tree, n×m=$4^2$=16

One electrical connection to the phase tuner 24 may be designated as the anode, and the opposite connection is designated as the cathode. In the case of a micro-heater, i.e. resistive, phase tuner, the anode and cathode are interchangeable. In a preferred implementation, see FIG. 4, the anode of the micro-heater in each logical row is connected to a row-bus, and the cathode of the micro-heater in each logical column is connected to a column-bus. All the row-buses are connected to an analog multiplexer (called a row-select) and all the column-buses are connected to another analog multiplexer (called a column-select.)

The first row-select analog multiplexer 33 and the second column-select analog multiplexer 35 may comprise electronics components mounted on a printed circuit board 40 separate from the photonic integrated circuit chip 25. Alternatively, the first and second analog multiplexers 33 and 35 may comprise electronics on the same chip 25 as the optical multiplexer switch tree device 21, or flip-chip bonded onto that chip 25. The common terminal of the column-select analog multiplexers is connected to ground.

The common terminal of the first row-select multiplexer 33 may connect to the independent digital to analog converter (DAC) channel 34, where the DAC channel 34 may further comprise a boost amplifier to drive the phase tuners 24, e.g. micro-heaters. The arrangement of the phase tuners 24, e.g. heaters, the column-select multiplexer 33, and the row-select multiplexer 33 may be repeated for each level of the optical multiplexer switch tree 21. Preferably, an independent DAC channel 34 may be provided and connected to the row-select multiplexer 33 for each level.

To select an output channel of the optical multiplexer switch tree 21, the DAC channel 34 of each level is updated to specific voltage values that are pre-calibrated. Then, both the row-select multiplexer 33 and the column-select multiplexer 35 on each level are switched by the controller processor 30, e.g. an FPGA or a microcontroller, to power on the desired micro-heaters 24 in the entire optical multiplexer switch tree 21. Alternatively, all row-selects for all levels may connect to a single DAC channel 34 if all the optical switches 23 turn on and off at similar voltage levels. Similar concepts also may be useful for general M×N optical switch trees, where the switch tree has multiple inputs.

With this scheme, one may reduce the pad count from N−1 (conventional case) to approximately $\Sigma_{i=0}^{p} \sqrt[p]{2^i}$, where p is the total number of levels (=$\log_2$ N). For example, a 1:4096 massive optical switch tree needs only about 216 pads compared to 4095 pads for the conventional drive scheme. Also, the number of independent DAC only equals to the number of levels p=12. The other benefit of this proposed scheme is low power consumption, since only one heater will be turned-on for each level.

Launching and receiving beams of light at a variety of controllable angles has various applications, including free-space communications, holography, and light detection and ranging (LIDAR). A LIDAR sensor is an optical remote sensor that measures the distance to a target, by irradiating the target with light, using pulses or a modulated signal from a laser, and measuring the time it takes the light to travel to and from the target to a receiver in the LIDAR sensor. When, the reflected pulses or modulated signals are detected, the time of flight of the pulses or modulated signals correspond to the distance to the sensed target. LIDAR sensors are important components in autonomous vehicles, drone navigation systems, and robot interaction, but is currently costly and relatively large.

Figure 5:
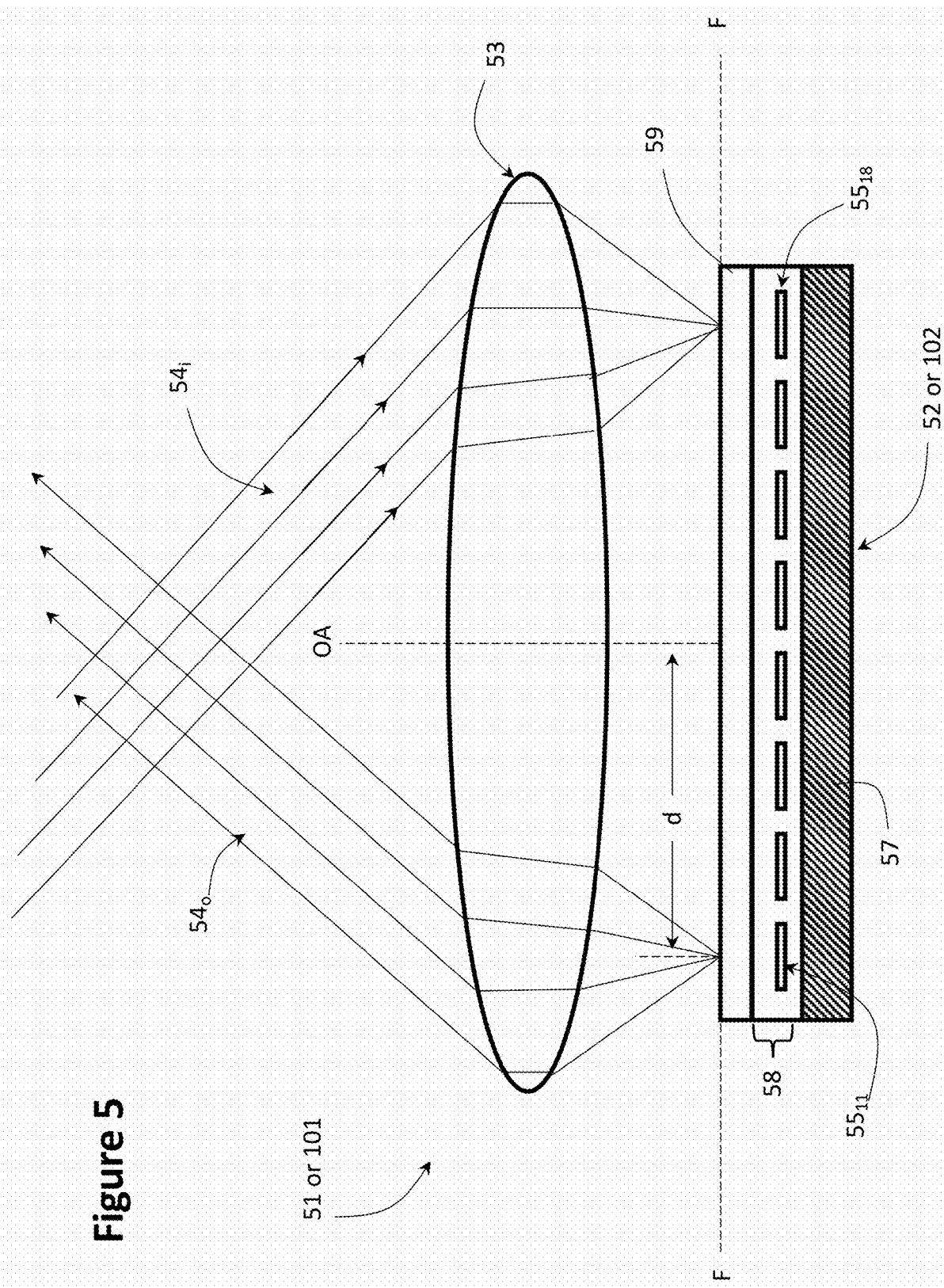
FIG. 5 is a side view of an optical emitter device in accordance with an embodiment of the present disclosure.

Long range LIDAR systems rely on efficient transmitting and receiving a highly focused or collimated beam to and from different angular directions. While lenses are typically associated with imaging, lenses may be applied to both beamforming and beam-steering. With reference to FIG. 5, and U.S. patent application Ser. No. 16/946,883 filed Jul. 10, 2020 and Ser. No. 17/373,201 filed Jul. 12, 2021, which are incorporated herein by reference, an optical emitter device 51 includes an emitter array 52 and a beam steering lens system 53. For beamforming, a highly collimated output beam $54_o$ may be transmitted when a point emitter $55_{11}$ to $55_{nm}$ from the emitter array 52 is placed on the focal plane F of the lens system 53 (infinite conjugation). The reverse propagation is also true based on the reciprocity theorem, whereby a parallel input beam $54_i$ shining on the lens system 53 will focus at a point spot to be captured by one of the point emitters $55_{11}$ to $55_{nm}$, with a slight spread limited by lens aberration and diffraction. For beam-steering, the far-field beam angle α of the shaped, e.g. substantially collimated or focused, output beam $54_o$ depends on the location of the point emitter $55_{11}$ to $55_{nm}$ on the focal plane F relative to the longitudinal central optical axis OA of the lens system 3. The beam angle α is governed by the equation: α=arctan (d/f), where d is the distance from the center of the focal plane, i.e. the point where the optical axis OA coincides with the focal plane F, and f is the focal length of the lens system 53. Therefore, a full LIDAR system may be implemented by placing an emitter array 52 of point emitters $55_{11}$ to $55_{nm}$ on or near the focal plane F of the lens system 53, then selectively switching on and off each point emitter $55_{11}$ to $55_{nm}$ for redirecting and steering the one or more output beams $54_o$ in the desired directions at the desired beam angles α. This method is fundamentally different than optical phased arrays as the relative optical phase between the emitters does not need to be controlled, and only one point emitter $55_{11}$ to $55_{nm}$ needs to be turned on at a time. Moreover, a plurality of point emitters $55_{11}$ to $55_{nm}$ may be activated simultaneously for transmitting multiple output beams $54_0$ pointing in different directions, i.e. at different beam angles $α_{11}$ to $α_{nm}$.

The emitter array 52 may include: a main substrate 57 for supporting an optical waveguide structure 58, including the point emitter $55_{11}$ to $55_{nm}$; and an upper turning substrate 59 for supporting beam directing and/or beam shaping elements, as hereinafter described. Ideally, the point emitters $55_{11}$ to $55_{nm}$ are arranged into an array of point emitters $55_{11}$ to $55_{nm}$ comprising a plurality (n) of rows of point emitters $55_{11}$ to $55_{nm}$, and a plurality (m) of columns of point emitters $55_{11}$ to $55_{nm}$. Typically, the point emitters in the rows of point emitters are aligned, and the point emitters in the columns of point emitters are aligned, but the rows and/or columns of point emitters may be offset. There are many ways that the point emitters $55_1$ to $55_n$ may be realized, including end-fire tapers, end-fire tapers with a turning mirror, single layer grating couplers, and bilayer grating couplers.

The design of the lens system 53 may be critical to the system's performance. The lens system 53 may comprise a plurality of lens elements, if required. Most of the design of the lens system 53 is a compromise between the F-number, the field-of-view, and the aperture size. However, there may be a few design priorities: e.g. a) to have an image-plane telecentric design, where the chief rays from the point emitters $55_{11}$ to $55_{nm}$ are all parallel to the optical axis OA in the image space, b) reaching diffraction limit across the field-of-view, and c) the image space numerical aperture (NA) of the lens system 53 substantially matches the NA of the point emitters $55_{11}$ to $55_{nm}$. Chief rays parallel to the optical axis OA will enable the point emitters $55_{11}$ to $55_{nm}$ to be designed fully vertical. Minimizing the effect of lens curvature aberrations enables the smallest spread in the output beams 40 and the best possible focusing for the receiving input beams $54_i$. The point emitters $55_{11}$ to $55_{nm}$ preferably emit output beams $54_o$ at a beam angle α that may be fully captured by the lens system 53. For example, if the NA of one or more of the point emitters $55_{11}$ to $55_{nm}$ is larger than the image space NA of the lens system 53, then a portion of the light emitting from the point emitters $55_{11}$ to $55_{nm}$ will not transmit through the lens system 53, therefore rendered as loss.

Figure 6:
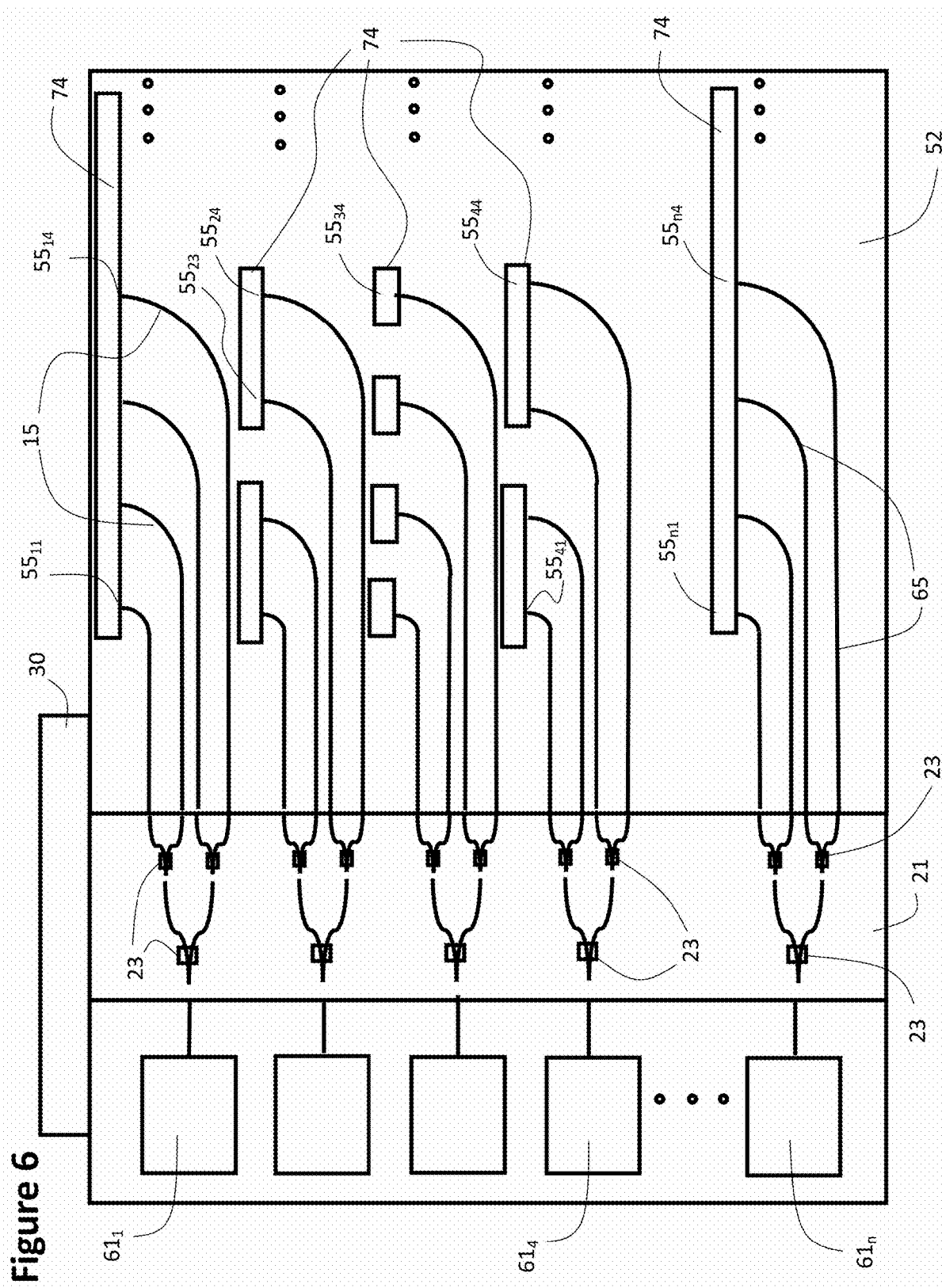
FIG. 6 is a plan view of an emitter array of the device of FIG. 5 with the turning substrate removed.

With reference to FIG. 6, the optical emitter device 51 may also include at least one light source, preferably an array of light sources, and at least one photodetector, preferably an array of photodetectors optically coupled to corresponding point emitters $55_{11}$ to $55_{nm}$ in the emitter array 52. Preferably, the array of light sources and the array of light detectors comprises an array of transceivers $61_1$ to $61_n$. Each transceiver $61_1$ to $61_n$ may comprise a laser, which generates at least one of the output beams $54_o$, and a photodetector, which detects at least one of the input beams $54_i$. Selectively sending and receiving light to and from the point emitters $55_{11}$ to $55_{nm}$ may be provided by the optical switch tree 11 between the transceivers $61_1$ to $61_n$ and the emitter array 52. Accordingly, to select a desired point emitter $55_{11}$ to $55_{nm}$, corresponding to a desired beam angle α, the controller processor 30 may select one of the light sources in one of the transceivers $61_1$ to $61_n$, corresponding to one of the rows, e.g. 1 to n, of point emitters $55_{11}$ to $55_{nm}$, then select one of the point emitters $55_{11}$ to $55_{nm}$, in that row by turning on and/or off various switches 23 in the optical switch tree 11. A plurality of optical waveguide cores 65 extend parallel to each other between the output ports of the optical switch tree 11 to the point emitters $55_{11}$ to $55_n$. Each of the optical waveguide cores 65 may include a curved portion, e.g. a 90° curve, at an end thereof, each curved portion with a different radius of curvature configured to align each of the point emitters $55_{11}$ to $55_{nm}$ in a row. Each row of point emitters $55_{11}$ to $55_{nm}$ may be aligned with the other rows forming columns of point emitters $55_{11}$ to $55_{nm}$ in a n×m emitter array 52 of point emitters $55_{11}$ to $55_{nm}$. Ideally, the pitch of the point emitters $55_{11}$ to $55_{nm}$ in the emitter array 52 is 5 μm to 1000 μm or based on the focal length f, size L of the emitter array 52 and the angular resolution required by the LIDAR system:

$$\text{Pitch} = \text{resolution}/(2*\arctan(L/2f))*L$$

Similarly, when one of the incoming beams $54_i$ is received at the same point emitter $55_1$ to $55_n$, the incoming beam $54_i$ is transmitted in reverse via the corresponding optical waveguide core 65 to the optical switch tree 11 back to the corresponding photodetector in the corresponding transceiver $61_1$ to $61_n$.

With reference to FIGS. 7A-7B, the point emitters $55_{11}$ to $55_{nm}$, may each comprise an end-fire taper 71 combined with a turning reflector 72, e.g. mirror, and an optional micro-lens 73, (See FIGS. 5 and 6 for further details). Unlike grating couplers, end-fire tapers 71 enable uniform broadband transmission of light with all possible polarization states. The turning reflector 72 may be disposed in a cavity or trench 74 provided in the optical waveguide structure 58 to direct the light emission from the end-fire tapers 71 to parallel with the optical axis OA of the lens system 53, e.g. vertically upwards from and perpendicular to an upper surface of the emitter array 52, which enables both a two-dimensional point emitter array 52 and a more streamlined assembly process.

FIG. 7A illustrates a top view of a section of the point emitter array 52 with the turning substrate 59 removed, i.e. showing one row of point emitters $55_{11}$ to $55_{14}$. Four point emitters are illustrated; however, additional point emitters are also within the scope of the invention. FIG. 7B illustrates a cross-sectional view of the section of the emitter array 52 taken along section B-B. FIGS. 7C and 7D are cross-section views of the emitter array 52 with alternative turning reflectors 72, taken along section C-C, i.e. the outer optical waveguide core 65 to the fourth point emitter $55_{14}$. The emitter array 52 may include the optical waveguide structure 58, comprised of one or more optical waveguide layers configured to form the optical waveguide cores 65 and the end-fire tapers 71 surrounded by cladding, i.e. a material with a lower index of refraction. The optical waveguide cores 65 and the end-fire tapers 71 may be comprised of silicon (Si) or silicon nitride (SiN), or both Si and SiN or any other suitable optical waveguide core material. The optical waveguide structure 58 may be mounted on, e.g. grown on top of, the main substrate 57 with upper and lower cladding 78 and 79 surrounding the optical waveguide cores 15 and the end-fire tapers 71. The upper and lower cladding 78 and 79 may be comprised of on oxide material, such as silicon dioxide ($SiO_2$), e.g. 2-5 μm thick, and the main substrate 57 may be comprised of silicon, quartz or any suitable material. At least some of the end-fire tapers 71 may be 100 μm to 400 μm in length and taper down, e.g. by 25% to 75%, preferably by about one 50%, from the original width of the optical waveguide core 65, e.g. 400 nm to 500 nm wide by 200 nm to 250 nm thick, to a tip with a width of 50 nm to 300 nm and the original thickness, e.g. 200 nm to 250 nm, although the thickness may also be tapered to less than the optical waveguide core 65, if required. Preferably, the end of the end-fire tapers 71 may be symmetrical, e.g. square (200 nm×200 nm). At least some of the end-fire tapers 71, e.g. point emitter $55_{11}$, may comprise reverse tapers, which expand, at least in width, from the original dimensions, e.g. width, of the optical waveguide core 65 to a wider width, e.g. 2× to 10× wider or to 1 mm to 4 mm wide. The thickness may also expand, if required. Some of the end fire tapers 71 may be narrowing in width and some of the end fire tapers 71 may be widening in width. Some of the end fire tapers 71 may narrow more or less than other end fire tapers 71, and some of the end fire tapers may widen more or less than the other end fire tapers 71.

Figure 8:
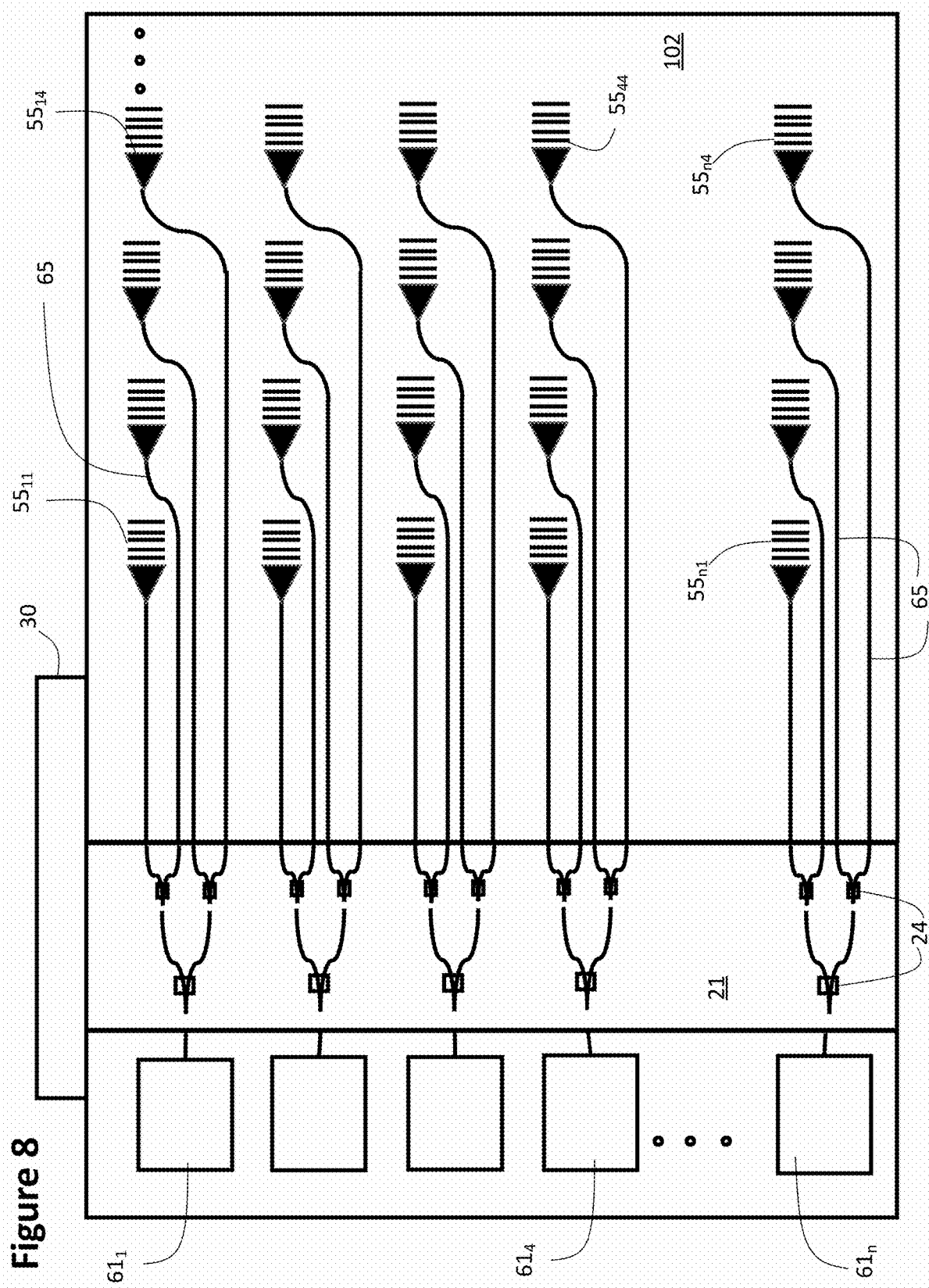
FIG. 8 is a plan view of an alternative embodiment of the emitter array of the device of FIG. 5.
Figure 9A:
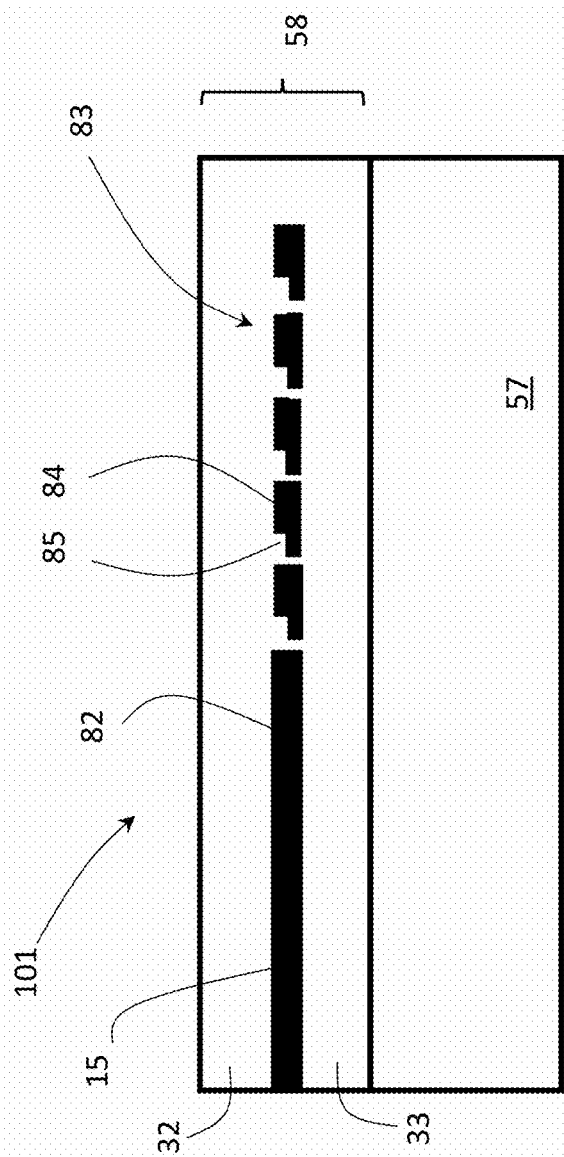
FIG. 9A is a cross-sectional view of a point emitter of the emitter array of FIG. 8 with the turning substrate.
Figure 9B:
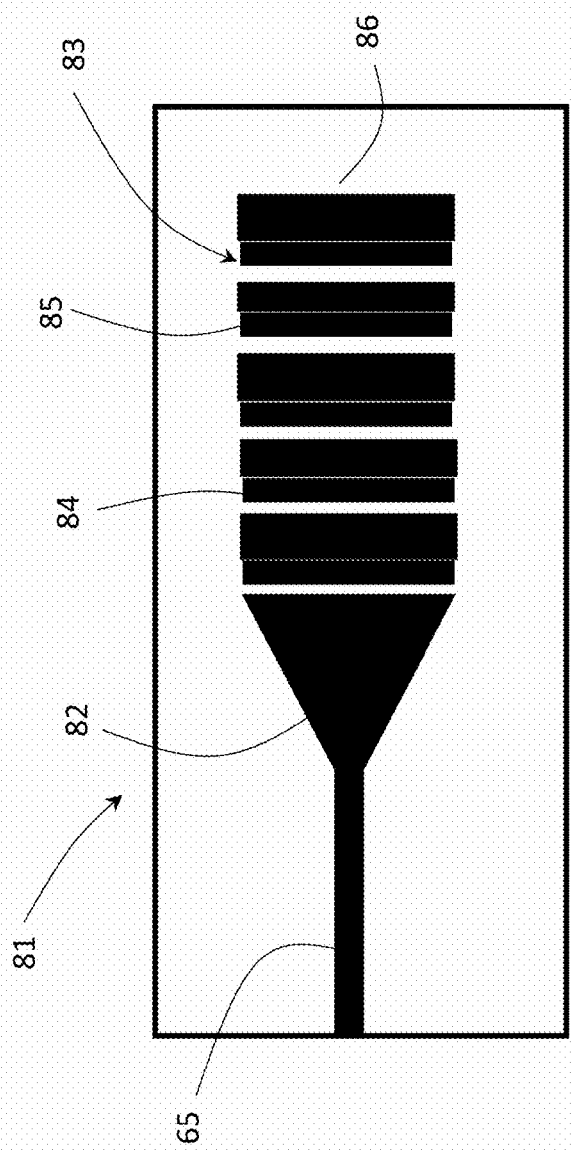
FIG. 9B is a top view of the point emitter of FIG. 9A.

In an alternative embodiment, illustrated in FIGS. 8, 9A and 9B, an optical emitter device 101 includes an emitter array 102 and the beam steering lens system 53. As above with reference to FIG. 6, for beamforming, the highly focused or collimated output beam $54_o$ may be transmitted when the point emitter $55_{11}$ to $55_{nm}$, from the emitter array 102 is placed on or near the focal plane F of the lens system 53 (infinite conjugation). The reverse propagation is also true based on the reciprocity theorem, which a parallel beam $54_i$ shining on the lens system 53 will focus at a point spot, with a slight spread limited by lens aberration and diffraction. All other features of the optical emitter device 101 are similar to the optical emitter device 51, e.g. a main substrate 57 for supporting an optical waveguide structure 58, except that the point emitters $55_{11}$ to $55_{nm}$, may comprise a very small grating coupler 81 (length and width at the order of a few μm) connected to the feeding optical waveguide cores 65, which may all be provided, e.g. fabricated, in a silicon layer on a silicon-on-insulator (SOI) wafer. The grating coupler 81 may comprise an expanding optical waveguide section 82 and a corrugated grating section 83 comprising laterally-extending, i.e. perpendicular to transmission direction, periodic, spaced-apart, optical waveguide grating structures 84 with notches 85 extending partially through. The grating section 83 may include a width as wide as the wider outer end of the expanding optical waveguide section 82. The notches in the optical waveguide grating structures 84 may form a step, whereby a first portion of each optical waveguide grating structure 84 extends a different depth into the grating section 83 than a second portion of each optical waveguide structure 84. For example, the first portion may be the full thickness of the grating section 83, which may be the same thickness as the expanding optical waveguide section 82, which may be the same thickness as the optical waveguide cores 65. The second portion may only extend partially through, e.g. 40% to 60%, the grating section 83. The corrugated grating coupler 81 may add an extra momentum to the incoming waveguide mode, then couples the guided mode into a free space emission. The pitch and the depth of the optical waveguide grating structures 84 may be configured such that: a) the angle of emission is as close to vertical, i.e. perpendicular to the original transmission direction and the upper surface of the emitter array 2, as possible, and b) the grating coupler strength is strong enough to emit almost all the light. Ideally, the grating coupler 81 is 50 nm to 500 nm thick, 5 μm to 20 μm in length, and 5 μm to 20 μm in width, with a grating period of 0.5 μm to 1 μm.

Figure 10A:
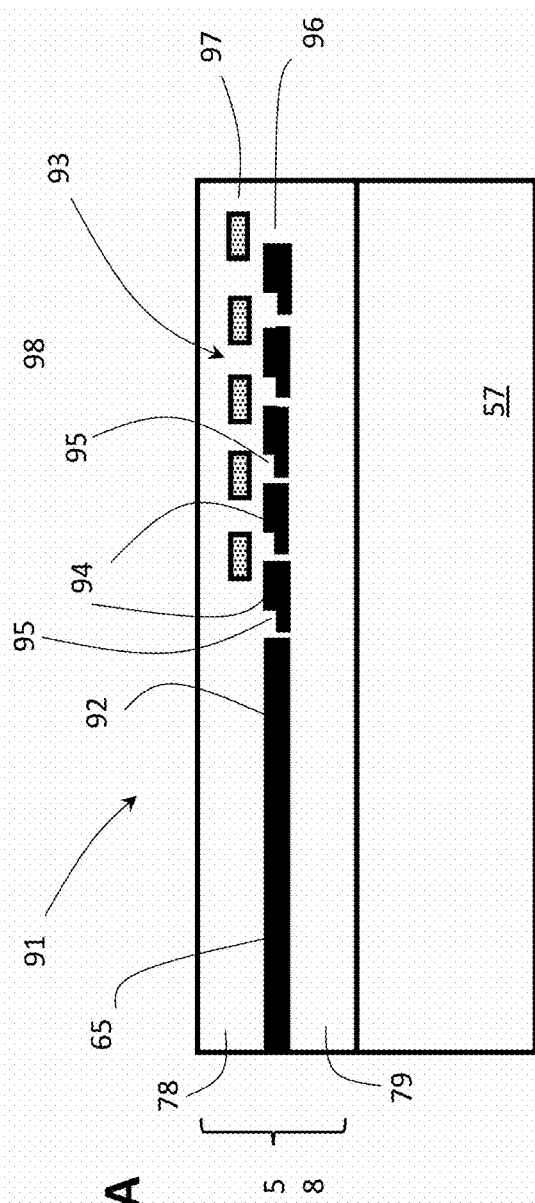
FIG. 10A is a cross-sectional view of an alternative embodiment of a point emitter of the emitter array of FIG. 8.
Figure 10B:
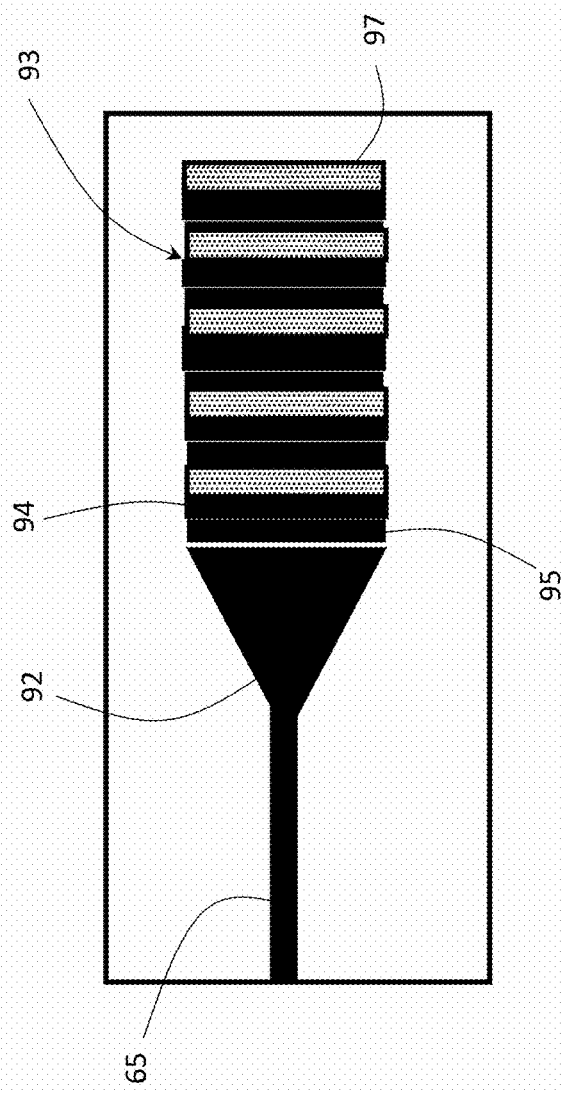
FIG. 10B is a top view of the point emitter of FIG. 10A.

In an alternative embodiment, illustrated in FIGS. 10A and 10B, the point emitters $55_{11}$ to $55_{nm}$ may comprise a very small grating coupler 91 (length and width at the order of a few μm, e.g. 2 μm to 5 μm) connected to the feeding optical waveguide cores 65, which may all be provided, e.g. fabricated, in a silicon layer on a silicon-on-insulator (SOI) wafer. The grating coupler 91 may comprise an expanding optical waveguide section 92 and a corrugated grating section 93 comprising laterally-extending, i.e. perpendicular to transmission direction, periodic, spaced-apart, optical waveguide grating structures 94 with notches 95 extending partially therethrough. The grating section 93 may include a width as wide as the wider outer end of the expanding optical waveguide section 92. The grating section 93 may be comprised of a bilayer structure including a bottom layer 96 of a first optical waveguide material, e.g. silicon, and a top layer 97 comprised of a different material, with a lower index of refraction than the first material, e.g. a silicon nitride (SiN), all surrounded by upper and lower cladding 78 and 79, e.g. silicon dioxide. The notches 95 in the optical waveguide grating structures 94 in the bottom layer 96 may form a step, whereby a first portion of each optical waveguide grating structure 94 extends a different depth into the grating section 93 than a second portion of each optical waveguide grating structure 94. For example, the first portion may be the full thickness of the grating section 93, which may be the same thickness as the expanding optical waveguide section 92, which may be the same thickness as the optical waveguide cores 65. The second portion of the optical waveguide grating structure 94 may extend partially through, e.g. 40% to 60%, the grating section 93. The bottom and top layers 96 and 97 of the grating section 93 may have a translational offset, i.e. laterally offset from each other, whereby the grating structures in the top layer 97 overlap, i.e. superposed above, the spaces between the optical waveguide grating structures 94 in the bottom layer 96, and the spaces in the top layer 97 overlap the optical waveguide grating structures 94 in the bottom layer 96. The offset breaks the symmetry of the grating coupler 91 in the emitting direction. Ideally, the grating coupler 91 is 5 μm to 20 μm in length, and 5 μm to 20 μm in width, with a grating period of 0.5 μm to 1 μm. The pitch and the depth of the optical waveguide grating structures 94 may be configured such that: a) the angle of emission is as close to vertical, i.e. perpendicular to the original transmission direction and the upper surface of the emitter array 52, as possible, and b) the grating coupler strength is strong enough to emit almost all the light. Preferably, the thickness of the top layer 97, e.g. SiN, is 0.05 μm to 0.5 μm thick, with a separation between the bottom and top layers 96 and 97 is between 0 to 0.2 μm, preferably 0.05 μm to 0.02 μm. An example offset between grating material in the bottom and top layers 96 and 97 is between 0 to 0.5 μm, preferably 0.01 μm to 0.05 μm.

In the configuration described above, the number of emitters should equal $2^N$, where N is the number of switch tree levels. This is because each switch 23 directs one input to two outputs, i.e. it makes up a binary tree. In the case where a different number of emitters 55 is desired, it is possible to leave some outputs of any level of the tree disconnected, such that some switch configurations do not direct light to an emitter 55. Similarly, if a switch 23 in the tree has only one output 26 connected to an emitter 55, that switch 23 may be omitted and replaced with a waveguide connecting the input and output without switching, in effect bypassing that level of the switch tree, thereby reducing complexity and power consumption of the system.

It is preferable that every switch 23 in each level of the optical multiplexer switch tree 21 requires the same voltage or power to be applied to it to switch from one state to the other. In the case of a Mach-Zehnder switch, this means that each phase tuner 24 in a level preferably has the same voltage or power to induce a π phase shift or $V_\pi$, in the case of an electro-optic phase shifter, or $P_\pi$, in the case of a thermo-optic phase shifter. Further, in the case of a resistive thermo-optic phase shifter, each resistor preferably should have the same resistance, as well-matched as possible in the fabrication process, such that the same voltage applied to each switch 23 effects the same power consumption and the same phase shift. Preferably the matching in both resistance and $P_{pi}$ is better than 10%. In the case where sufficient matching is not possible, the driving voltage from digital to analog converter (DAC) channel 34 may be adjusted for each configuration of the row and column multiplexers 33 and 35, such that each of the switches 23 properly directs its output substantially in either its left or right output ports with minimal crosstalk.

It should be noted that, for many practical applications of integrated photonics, especially for optical phased arrays, a large number of phase shifters must be densely packed on the chip. When multiple phase shifters are used, the phase shifters must be spaced far enough apart to prevent thermal crosstalk, where one heater will change the phase of light travelling through neighboring phase shifters because the lateral spread of heat warms those waveguides as well. If the phase shifters are arrayed in a straightforward one-dimensional array (array unit vector perpendicular to the light propagation direction), they must be separated by over about 15 µm to ensure less than 10% crosstalk. Conventional configurations are also very awkwardly shaped for large arrays, as a 1024-phase-shifter array would occupy a rectangle of approximately 500 µm×16 mm.

Figure 11:
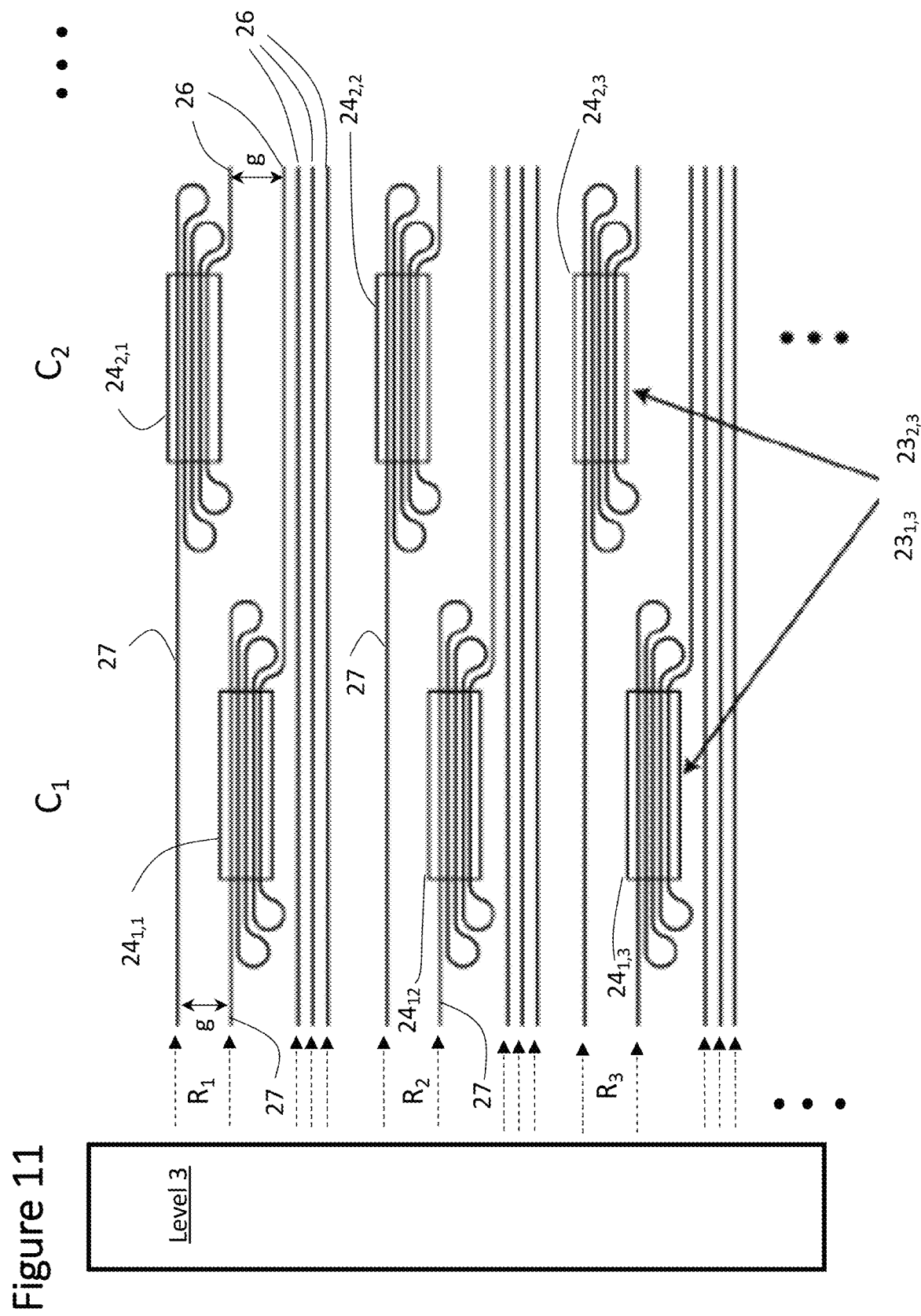
FIG. 11 is a top view of an array of optical phase shifters feeding an optical phased array.

With reference to FIG. 11, the plurality of phase tuners $24_{M,N}$, which may be arranged into a plurality of (M) columns and a plurality of (N) rows, i.e. forming a 2-dimensional (M×N) array of phase tuner $24_{M,N}$. Adjacent columns of phase tuners $24_{M,N}$ may be in a staggered configuration, e.g. adjacent phase tuners $24_{M,N}$ in alternating columns may be vertically offset by a predetermined gap g, e.g. by at least a width of one of the phase tuners $24_{M,N}$, so that adjacent phase tuners $24_{M,N}$ are not directly adjacent each other, and so that input waveguides 27, extending into the phase tuners $24_{M,N}$, optically coupled to the output optical waveguides of the previous level of the optical multiplexer switch tree device 21, and output waveguides $26_1$ to $26_{32}$ extending out of each phase tuners $24_{M,N}$ may also be the predetermined gap g width apart, and therefore do not physically overlap or cause any optical crosstalk therebetween.

Figure 12A:
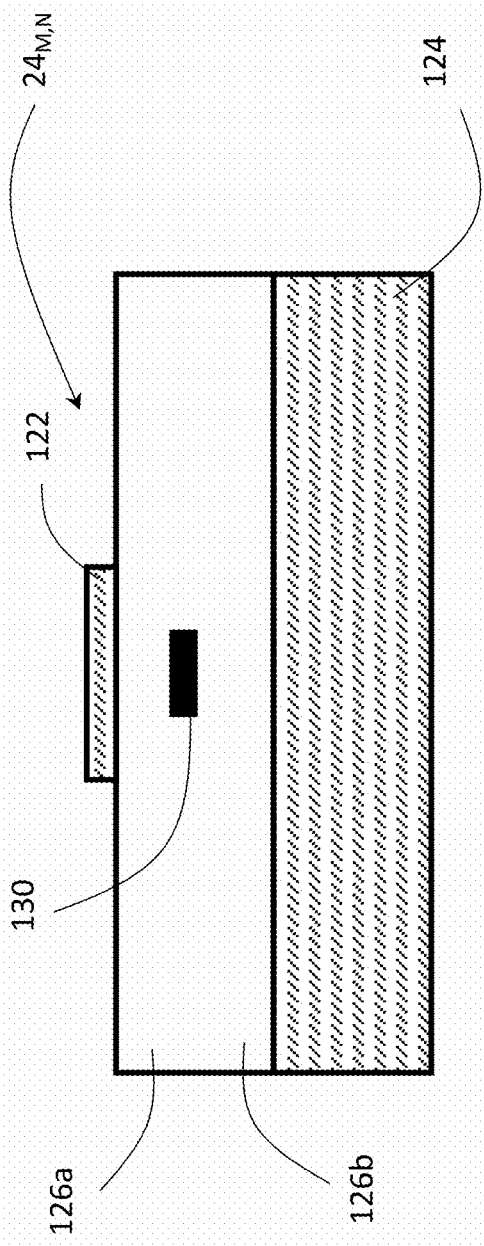
FIG. 12A is a side view of an optical phase shifter.
Figure 12B:
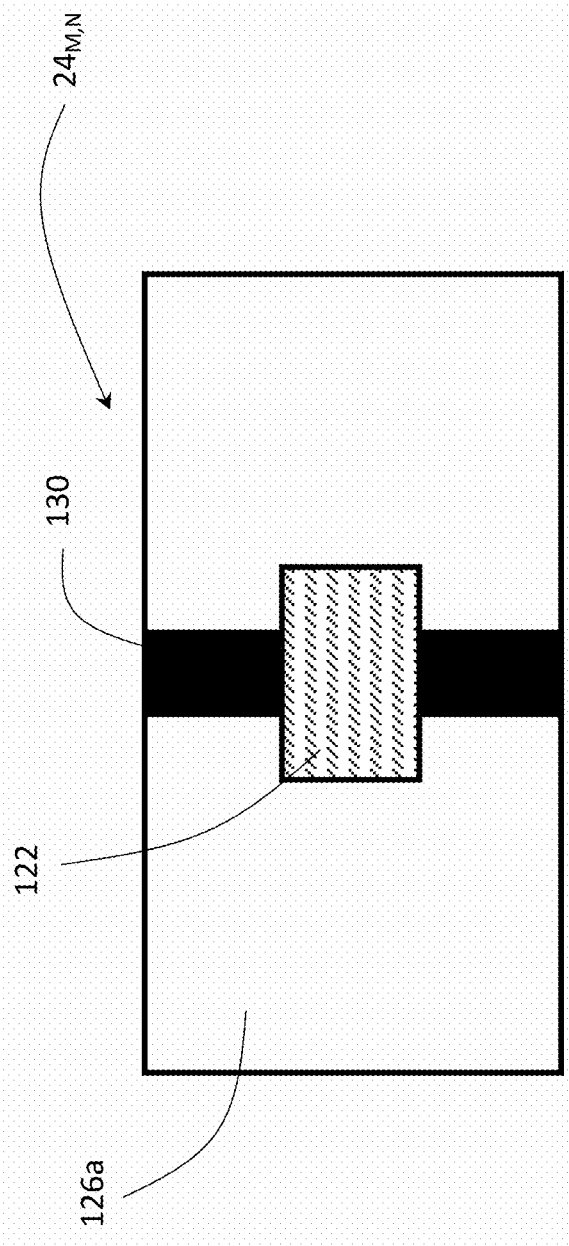
FIG. 12B is a top view of the optical phase shifter of FIG. 12A.
Figure 13:
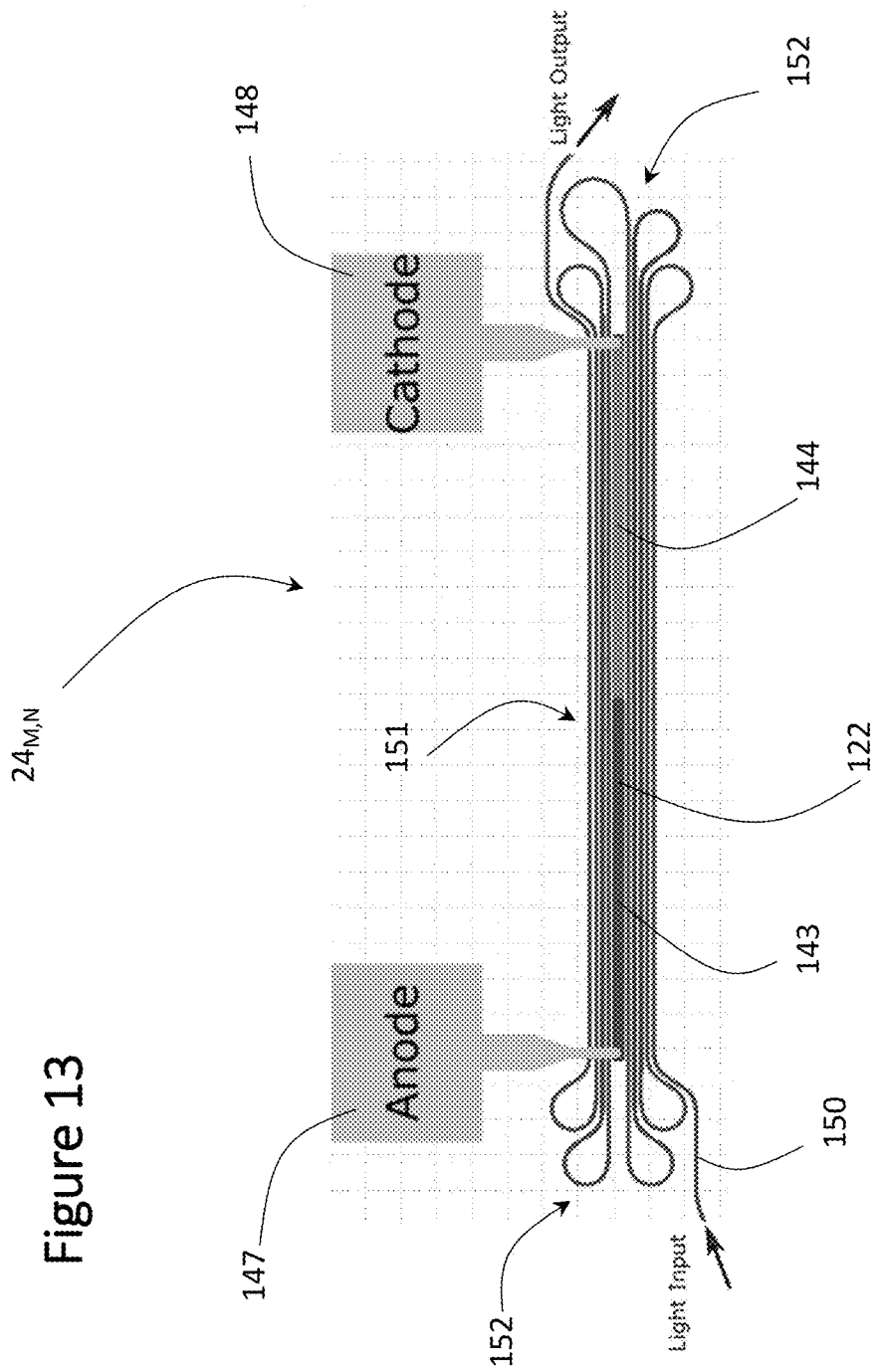
FIG. 13 is a top view of a multi-pass waveguide phase shifter, in accordance with an exemplary embodiment of the present disclosure.
Figure 16A:
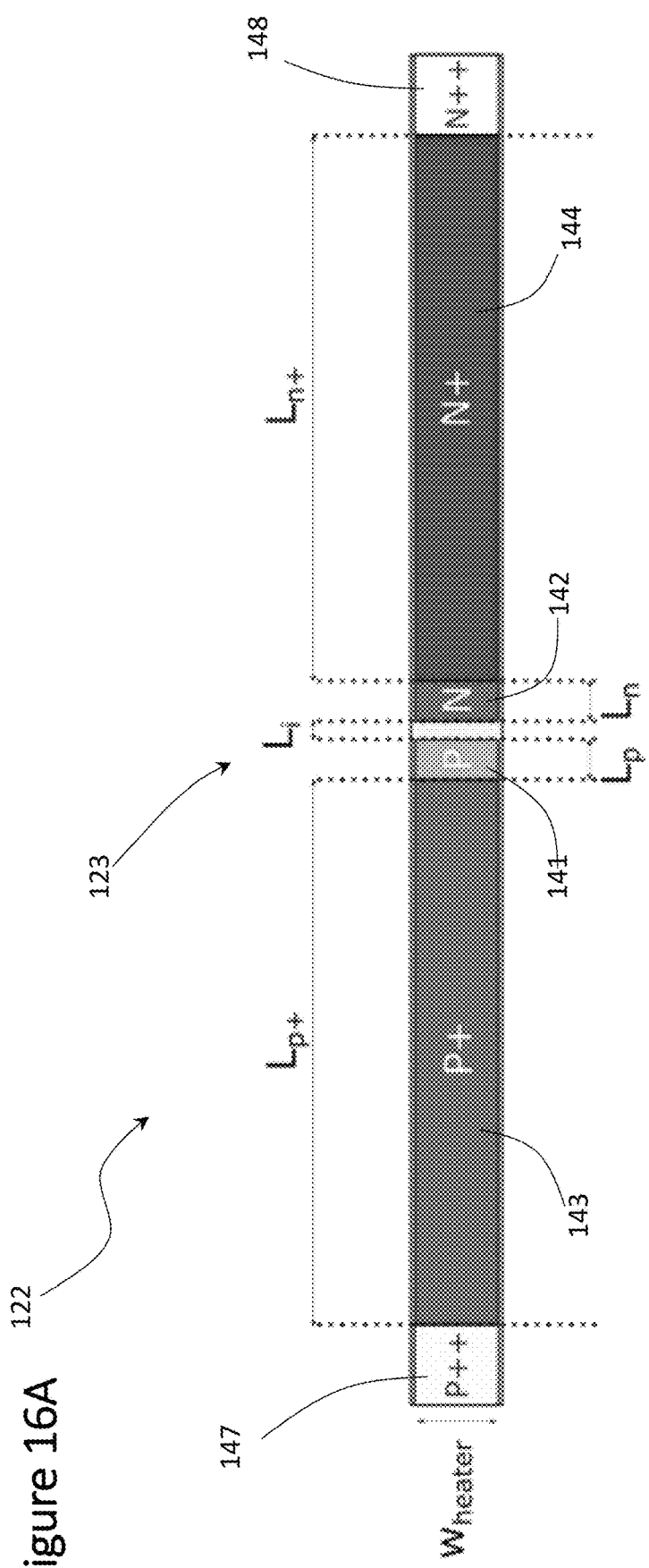
FIG. 16A is a top view of an exemplary doped silicon heater of the multi-pass optical waveguide phase shifter of FIG. 13.
Figure 16B:
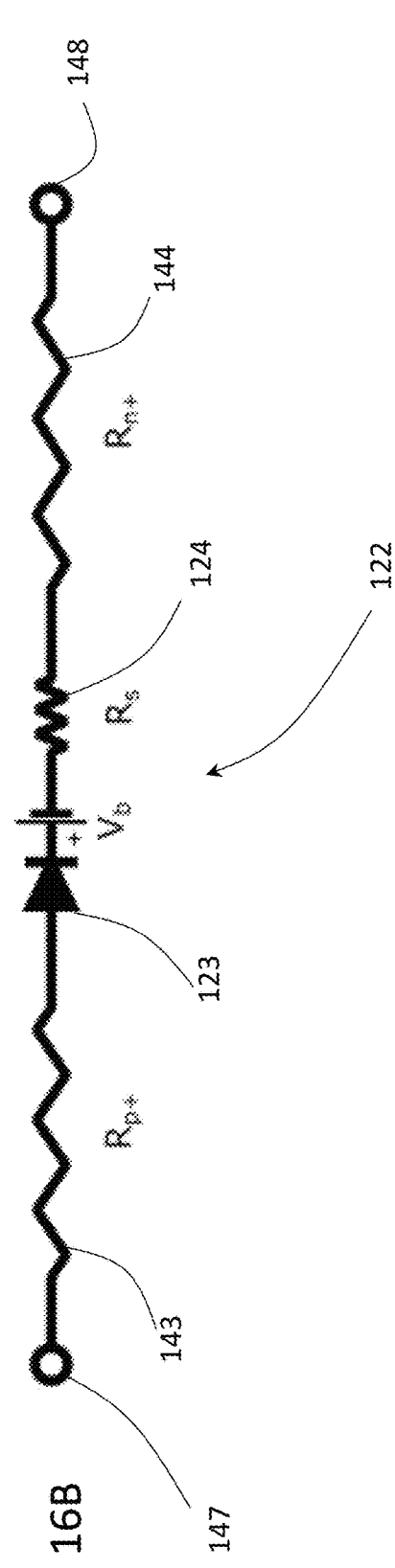
FIG. 16B is a schematic diagram of the doped silicon heater of FIG. 16A.

With reference to FIGS. 12A and 12B, each phase tuner $24_{M,N}$, may include a substrate 124, which may be comprised of silicon or other suitable material. Adjacent to, e.g. on top of, the substrate 124 may be layers of cladding, e.g. an upper cladding layer 126a and a lower cladding layer 126b, which may be comprised of a dielectric material, such as silicon dioxide. A heater 122, e.g. a resistor or a resistor and a diode 123, may be positioned on the upper cladding layer 126a. The heater 122 may be any suitable device or material configured to generate heat, e.g. titanium nitride, nichrome, heavily doped silicon, silicide, titanium, and tungsten. In some embodiments, the heater 122 comprises a resistor, such as a metal or semiconducting wire that heats up when current is passed therethrough. There may be an optical waveguide 130 formed in a device or a waveguide layer positioned between the upper and lower cladding layers 126a and 126b, directly below the heater 122. As depicted in FIG. 12A, the optical waveguide 130 extends parallel to the substrate 124, with the orientation of the optical waveguide 130 parallel to the heater 122, shown in the top view of FIG. 12B. Accordingly, heat from the heater 122 spreads downward through the upper cladding layer 126a and into the optical waveguide 130. Heat also spreads laterally, both in the upper and lower cladding layers 126a and 126b, and the underlying substrate 124. The distribution of heat at the optical waveguide layer falls off over several microns as the distance from the heater 122 and the optical waveguide 130 increases.

The heater 122 may be positioned on top of or within the upper cladding 126A. The heater 122 may be comprised of, for example, a metal, a metal alloy, e.g. nichrome, a conductive metal nitride, or a silicide. Alternatively, the heaters 122 may comprise doping in and/or around the optical waveguide 130 itself, whereby passing current through the optical waveguide layer and/or the optical waveguide 130 causes heating of the optical waveguide 130. Other types of phase tuners $24_{M,N}$ are within the scope of the invention as hereinafter described, and including those disclosed in U.S. patent application Ser. No. 16/826,051 filed Mar. 20, 2020 in the name of the Applicant.

The diodes 123 may comprise silicon PN diodes, silicon PIN diodes, Schottky diodes, germanium diodes or any other suitable diode. The forward voltage and reverse breakdown voltage of the diodes 123 affect system performance and efficiency. The diodes 123 may be configured to include an absolute reverse breakdown voltage larger than the maximum DAC drive voltage, whereby the diodes 123 are configured to block reverse current flow through the heaters 122 to other heaters 122 in other columns $C_1$-$C_M$ of phase tuners $24_{M,N}$ where it is not intended as part of the drive algorithm. Each diode 123 may be configured such that an anode thereof is connected towards the $DAC_1$ and a cathode is connected towards a respective one of the ground-bus $32_1$ to $32_M$ (assuming positive DAC voltages).

The switches SW_R1-SW_Rn in the analog multiplexer 33 and SW_C1 to SW_Cm in the analog multiplexer 35 may comprise metal oxide semiconductor field-effect transistors (MOSFETs), bipolar junction transistors (BJTs), junction field effect transistors (JFETs), or other transistors configured to form a low-resistance path to the common ground GND. Particularly, it is preferable to have a resistance in each switch SW_R1-SW_Rn and SW_C1 to SW_Cm much less than, e.g. typically less than one tenth of, the resistance in the thermal phase tuners $24_{M,N}$ to minimize cross talk and maximize accuracy of the set phase shift. N-type field effect transistors are often preferred because they provide a low-resistance path to ground, i.e. a low on-resistance, and have very low built-in voltage across the switch SW_R1-SW_Rn and SW_C1 to SW_Cm, i.e. the drain to source voltage, thereby allowing the ground-busses $32_1$-$32_m$ to remain at the lowest possible voltage relative to the DAC drive voltages. The built in voltage of each switch SW_R1-SW_Rn and SW_C1 to SW_Cm and each ground bus $32_1$-$32_M$ is typically less than 1 Volt. It may be beneficial to configure the switches SW_R1-SW_Rn and SW_C1 to SW_Cm using more than one transistor per switch SW_R1-SW_Rn and SW_C1 to SW_Cm, for example a transmission gate, or adding additional control transistors to decode a signal from the controller processor 30 or ensure that only one switch SW_R1-SW_Rn and SW_C1 to SW_Cm is closed at a time, i.e. break before make switching.

With reference to FIGS. 13, 14A, 14B, 15A and 15B, each phase tuner $24_{M,N}$ may include an optical waveguide 150 comprised of a plurality of optical waveguide sections 151, which may be straight and parallel to each other, routed adjacent to the heater 122 in a serpentine fashion, connected by optical waveguide bends 152 at each end thereof for directing light back through the subsequent one of the plurality of waveguide sections 151. Similar to the embodiment shown in FIGS. 12A and 12B, the phase tuner $24_{M,N}$ may comprise a substrate 154, e.g. silicon, adjacent to a lower cladding layer 155, e.g. silicon dioxide, an optical waveguide layer 156, including the plurality of optical waveguide sections 151, and an upper cladding layer 157 above the waveguide layer 156. The heater 122 may be integrated into a strip of waveguide material in the optical waveguide layer 156, although other heater arrangements are possible, such as the heaters 122 to the side of the waveguide 150 in the same waveguide material layer 156, or heaters 122 made of a metal or ceramic material embedded in the upper cladding layer 157. In the embodiments shown in FIGS. 14A and 14B, there are at least six waveguide sections 151 included in the optical waveguide 150 that extend parallel to the heater 122.

A function of the diodes 123 is to prevent current from each digital to analog converter $DAC_1$-from flowing from the selected column of phase tuners $24_{M,N}$ into the other non-selected columns of phase tuners $24_{M,N}$ via the electric traces or tracks in each row $R_1$-$R_N$. Therefore, the reverse-bias breakdown voltage of the diodes 123 should be higher than the maximum drive voltage in any instance for all the digital to analog converter $DAC_1$ channels.

Connecting on-chip heaters 122 with an external pn-diode 123 will lower power efficiency caused by the native built-in potentials for the diodes 123, which is typically around 0.7 V for a silicon pn device. When forward biasing the heater 122, the pn-diode 123 in series will consume a constant dc power equal to $i_{total} \times V_{turn-on}$, which generates heat, where $i_{total}$ is the total current flowing through both the diode 123 and the heater 122 and $V_{turn-on}$ is the turn-on voltage of the pn-diode 1123. Moreover, there is also the series resistance associated with the pn-diode 123 that also consumes power and generates heat. In configurations where the diode 123 is physically separated from the phase tuners $24_{M,N}$, this power dissipated in the diode 123 is lost to heat and does not cause optical effects. Silicon is referenced throughout the disclosure, but other materials, such as other optical waveguide materials are also within the scope of the invention.

The power efficiency may be improved by integrating the pn-diode 123 close to each phase tuners $24_{M,N}$ as part of the heater (diode heater) 122, meaning that the heat otherwise wasted now also contributes to heating the optical waveguide sections 151. Accordingly, the heater 122 may comprise an on-chip heater with an integrated pn-diode 123. The heater 122 may comprise two long heating sections of heavily-doped waveguide material, e.g. silicon, with opposite polarities (p and n). A pn-diode 123 may be sandwiched in the center along the shorter edges of the two heating sections, where the p-doped section may be connected to the anode of the pn-diode 123, and the n-side heating section is connected to the cathode of the pn-diode 123. An exemplary diode heater 122 and an equivalent circuit are shown in FIGS. 14A and 14B, which the diode heater 122 may comprise three main parts: 1) p-doped anode 141, e.g. silicon with a doping level at $5e^{16}1/cm^3$ to $5e^{18}1/cm^3$, 2) pn-diode, e.g. silicon, 123, and 3) n-doped cathode 142, e.g. silicon with a doping level at $5e^{16}1/cm^3$ to $5e^{18}1/cm^3$. The pn-diode 123 may be sandwiched between a longer heavily p-doped section 143, e.g. of silicon, including a doping material with a higher concentration of p-doping than the p-portion of the pn-diode 123, and a longer heavily n-doped section 144 including an n-doping material with a higher concentration of n-doping than the n-portion of the pn-diode 123. The heavily p-doped section 143, e.g. P+ silicon, may be connected to the anode 141 of the pn-diode 123, and the heavily n-doped section 144, e.g. N+ silicon, may be connected to the cathode 142 of the pn-diode 123. The heavily p-doped section 143 or the heavily n-doped section 144 may also include a layer of silicide formed on top to further reduce their resistivities. The silicide formation is a standard process in silicon photonics foundries that is typically used in forming ohmic contact between silicon and metals.

The lengths, widths, and sheet resistivities of the heavily p-doped section 143 and the heavily n-doped section 144 dominate the overall resistance of the diode heater 122, since the series resistance of the pn-diode 123 is typically a much smaller value. The reverse breakdown voltage of the pn-diode 123 may be adjusted by changing the length of the intrinsic region $L_i$. The larger the intrinsic region $L_i$ the larger the breakdown voltage of the pn-diode 123. However, a longer intrinsic region $L_i$ comes with the price of increased series resistance, which could cause non-uniform heating mostly in the center where the pn-diode 123 is located. This non-uniform heating may reduce the thermal-optic efficiency. The lengths of both the p-doped portion $L_p$ and the n-doped portion $L_n$ in the pn-diode 123 will also change the turn-on characteristics and series resistance of the pn-diode 123. An anode contact 147 and a cathode contact 148 may be placed on the far opposite ends of the diode heater 212 connecting to the heavily p-doped section 143 and the heavily n-doped section 144, respectively to minimize heat sinking that also reduces the efficiency of the heater 122. The interface between the anode contact 147 and the cathode contact 148 and the p-doped section 143 and the heavily n-doped section 144, respectively, may have a silicide layer to ensure ohmic contact.

Both the anode and cathode contacts 147 and 148 may be formed on the very edge of the heater 122 for electrical access. The width $W_{heater}$ of the heater 122 may be between 0.2 μm to 10 μm. The lengths of the heavily-doped silicon sections $L_{p+}$ and $L_{n+}$ are ideally between 10 μm to 1000 μm. The lengths of the p-doping portion $L_p$ and the n-doping portion $L_n$ in the pn-diode 123 may be between 0 to 2 μm. The length of the intrinsic region $L_i$ in the pn-diode 123 is ideally between 20 nm to 2 μm. In some embodiments, the intrinsic region $L_i$ of the diode 123 may be omitted, an p and n doping portions may touch directly. Ideally, the pn junction is placed in close enough proximity to the optical waveguide sections 151 of the phase tuner $24_{M,N}$ so that power dissipated on the pn-junction heats the waveguide sections 151 and causes a phase shift in light transmitted therein. The heater 122 may be placed right next to an array of waveguide sections 151, whereas each waveguide section 151 may be either a single waveguide or a ridge waveguide. The gaps (on both sides) between the heater 122 and the waveguide sections 151 may be between 0.4 μm to 2 μm.

The optical phase tuner $24_{M,N}$, as shown in FIGS. 14A to 15B, may be achieved through the relatively high thermo-optic coefficient in the optical waveguide material, e.g. silicon, which may be about 10 times more than the cladding layers 155 and 157, e.g. silicon nitride, via which the refractive index of the optical waveguide material, e.g. silicon, will change according to the temperature. Therefore, by placing the diode heater 122 very close to the optical waveguide sections 151, e.g. adjacent in the same waveguide layer 156, as forward bias is applied and current flows through the diode heater 122, the local temperature around the diode heater 122, including the optical waveguide sections 151, will increase, resulting in a change in the refractive index in the waveguide material. The light passing through the heated waveguide sections 151 then experiences an extra phase shift. Since the waveguide sections 151 and the diode heater 122 may be integral with and fabricated on the same waveguide, e.g. silicon, layer 156, there may also be a slab layer, e.g. silicon (FIG. 15A) connecting the diode heater 122 and the optical waveguide sections 151 that improves the thermal conduction. However, the gap between the diode heater 122 and the waveguide sections 151 and their dimensions can be carefully chosen to: 1) avoid excessive loss, and 2) reduce optical coupling between the optical waveguide sections 151 and the diode heater 122.

The heater 122 may also be used to heat up an alternative serpentine phase shifter $110_{M,N}$, such as the one disclosed in U.S. patent application Ser. No. 16/826,051, filed Mar. 20, 2020 in the name of the Applicant, which is incorporated herein by reference. This allows heating up multiple adjacent waveguide sections 151 directly or indirectly adjacent to or nearby the heater 122 at the same time.

The embodiments of thermal phase tuners $24_{M,N}$ may be arranged in a serpentine fashion, thereby increasing the total length of waveguide being heated by a singular heater 122. By routing the light in this manner, such that it makes several passes under or near the same heater 122, it is possible to salvage some of the heat that is otherwise wasted. This results in an increase in phase shift, associated with the increase in the heated length of waveguide, without increasing the length or the power consumption of the heater 122.

However, there are constraints associated with placing additional optical waveguide sections under or near the heater 122, e.g. in a serpentine arrangement. Typically, the optical waveguide sections 151 must be spaced several microns apart to eliminate optical leakage between adjacent optical waveguide sections 151. This typically-required spacing of several microns means that the optical waveguide sections 151 farther away from the center of the heater 122 have significantly less temperature change than any waveguide sections 151 proximate to the center of the heater 122, limiting the number of passes under or adjacent to the heater 122 and the ultimate efficiency gain of the technique.

Although thermal phase shifter configurations using a serpentine arrangement of waveguides have been proposed before, they do not address the constraints that limit the efficiency gain of the technique. For instance, some systems have proposed waveguides that are arranged in a serpentine fashion in order to increase efficiency and minimize power consumption. However, such waveguides all use the same cross sections, e.g. they are of the same width, which limits the number of passes under the heater.

The foregoing description of one or more example embodiments has been presented for the purposes of illustration and description. It is not intended to be exhaustive or to limit the invention to the precise form disclosed. Many modifications and variations are possible in light of the above teaching. It is intended that the scope of the disclosure be limited not by this detailed description.

We claim:

1. An optical device comprising:
   an optical switch array comprising:
      a plurality of first buses;
      a first multiplexer coupled to the first buses and configured to selectively connect one of the first buses to a first voltage, while disconnecting others of the first buses;
      a plurality of second buses;
      a second multiplexer coupled to the second buses and configured to selectively connect one of the second buses to a second voltage, while disconnecting others of the second buses;
      a plurality of optical switches, each optical switch coupled to a first bus and a second bus, each pair of first and second buses coupled to an optical switch; and
   a controller for coupling a selected optical switch between the first and second voltages by controlling the first and second multiplexers to selectively connect the first and second buses the selected optical switch is coupled to.

2. The device according to claim 1, wherein each optical switch comprises a Mach Zehnder interferometer, including a first arm and a second arm; and an optical phase tuner adjacent to the first arm.

3. The device according to claim 2, wherein the optical phase tuner comprises a heater configured to heat the first arm.

4. The device according to claim 3, wherein each optical phase tuner includes a resistor in series with a diode configured to prevent current from flowing to other optical phase tuners in optical switches coupled to the same first bus.

5. The device according to claim 4, wherein each diode is integrated with one of the optical phase tuners on a same chip.

6. The device according to claim 5, wherein each optical phase tuner includes a plurality of parallel waveguide sections routed adjacent to the heater in a serpentine fashion.

7. The device according to claim 4, wherein each switch of the plurality of optical switches requires a same voltage or power to be applied to switch from one state to another.

8. The device according to claim 4, wherein each resistor has substantially a same resistance, such that a same voltage applied to each switch effects a substantially same power consumption and a substantially same phase shift.

9. The device according to claim 1, wherein the first voltage is a common power source voltage, wherein the second voltage is common ground, and wherein the controller comprises:
   a processor; and
   a non-transitory memory for storing instructions, which when executed by the processor causes said controller to:
   control the first and second multiplexers to couple the selected optical switch between the common power source voltage and common ground, thereby selecting the selected optical switch for activation.

10. The device according to claim 1, wherein the plurality of optical switches are arranged in an array of rows and columns or optical switches, each row of optical switches coupled to a first bus, each column of optical switches coupled to a second bus.

11. The device according to claim 10, wherein the optical switch array comprises an optical switch tree comprising a plurality of levels, wherein input optical waveguides extending from a previous level are progressively longer in each row of optical switches, configured to enable lateral staggering of the optical switches in each row of optical switches, and wherein at least some output optical waveguides extending to a subsequent level are progressively shorter in each row of optical switches, configured to enable lateral staggering of optical switches in each row of optical switches.

12. The device according to claim 11, wherein at least some of the output optical waveguides include a bend, which are progressively shorter in each row of optical switches, configured to enable alignment of the optical switches laterally in each row of optical switches.

13. The device according to claim 11, wherein at least some of the input optical waveguides include a first bend, which are progressively longer in each row of optical switches, configured to enable substantial alignment of the optical switches laterally in each row of optical switches.

14. The device according to claim 13, wherein at least some of the output optical waveguides include a second bend, which are progressively shorter in each row of optical switches, configured to enable substantial alignment of the optical switches laterally in each row of optical switches.

15. The device according to claim 10, wherein the optical switch array comprises an optical switch tree comprising a plurality of levels and wherein output optical waveguide pairs extending to a subsequent level are progressively shorter in each row of optical switches, configured to enable lateral staggering the optical switches in each row of optical switches.

16. The device according to claim 1, further comprising a plurality of point emitters optically coupled to a respective output of the optical switch array for launching respective beams of light at respective transmission directions.

17. The device according to claim 16, further comprising a lens system, including a focal length and an optical axis, for redirecting the respective beams of light at a respective beam angle dependent upon a position of a respective one of the plurality of point emitters relative to the optical axis.

18. The device according to claim 16, further comprising a plurality of reflectors for redirecting the respective beams of light substantially perpendicular to the respective transmission directions.

19. The device according to claim 16, each of the plurality of point emitters comprises a diffraction grating.

20. The device according to claim 16, further comprising a LIDAR transceiver optically coupled to an input of the optical switch array.

* * * * *